(12) United States Patent
Qian et al.

(10) Patent No.: US 11,516,113 B2
(45) Date of Patent: Nov. 29, 2022

(54) SYSTEMS AND METHODS FOR NETWORK SLICING

(71) Applicant: Affirmed Networks, Inc., Acton, MA (US)

(72) Inventors: Haibo Qian, Frisco, TX (US); Srinivasan Muralidharan, Allen, TX (US); Kenton Perry Nickell, Frisco, TX (US); Ronald M. Parker, Boxborough, MA (US); Fred Rink, Fairview, TX (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 16/359,275

(22) Filed: Mar. 20, 2019

(65) Prior Publication Data

US 2019/0297002 A1 Sep. 26, 2019

Related U.S. Application Data

(60) Provisional application No. 62/645,484, filed on Mar. 20, 2018.

(51) Int. Cl.
*H04L 12/26* (2006.01)
*H04L 45/12* (2022.01)
(Continued)

(52) U.S. Cl.
CPC ............ *H04L 45/12* (2013.01); *H04L 45/24* (2013.01); *H04L 45/74* (2013.01); *H04L 47/20* (2013.01)

(58) Field of Classification Search
CPC ....................................................... H04L 45/12
See application file for complete search history.

(56) References Cited

U.S. PATENT DOCUMENTS 7,346,840 B1 3/2008 Ravishankar et al.
7,466,694 B2 12/2008 Xu et al.
(Continued)

FOREIGN PATENT DOCUMENTS

CN 1663217 A 8/2005
CN 101093590 A 12/2007
(Continued)

OTHER PUBLICATIONS

US 10,505,788 B2, 12/2019, Mills et al. (withdrawn)
(Continued)

*Primary Examiner* — Guang W Li
(74) *Attorney, Agent, or Firm* — Ray Quinney & Nebeker P.C; James Bullough

(57) ABSTRACT

Embodiments disclosed herein relate to systems and methods for network slicers. Network slicers can receive creation request messages and select network slices based on policies. A network slicer can indicate to next hop routers that it has lower routing costs in order to receive messages, and inspect the received messages to identify creation request messages. A network slicer can indicate to a DNS server that it has a higher priority than other network elements, and receive creation request messages based on the higher priority. New creation request messages can be sent to the selected network slices based on received creation request messages. The network can also create and send appropriate response messages to the creation request to establish future communications with the selected network slice.

30 Claims, 11 Drawing Sheets

(51) Int. Cl.
*H04L 47/20* (2022.01)
*H04L 45/74* (2022.01)
*H04L 45/24* (2022.01)

(56) References Cited

U.S. PATENT DOCUMENTS

| | | | |
|---|---|---|---|
| 7,734,746 | B2 | 6/2010 | Ng et al. |
| 8,428,610 | B2 | 4/2013 | Chowdhury et al. |
| 8,477,730 | B2 | 7/2013 | Rajagopalan et al. |
| 8,509,200 | B2 | 8/2013 | Li et al. |
| 8,522,241 | B1 | 8/2013 | Vohra et al. |
| 8,565,070 | B2 | 10/2013 | Harper et al. |
| 8,787,875 | B2 | 7/2014 | Ahmed et al. |
| 8,855,051 | B2 | 10/2014 | Suh et al. |
| 8,995,262 | B2 | 3/2015 | Chowdhury et al. |
| 9,013,993 | B2 | 4/2015 | Logan et al. |
| 9,185,595 | B2 | 11/2015 | Qu |
| 9,294,981 | B2 | 3/2016 | Rajagopalan et al. |
| 9,300,623 | B1 | 3/2016 | Earl et al. |
| 9,578,541 | B2 | 2/2017 | Seenappa et al. |
| 9,961,624 | B1 * | 5/2018 | Zait .................. H04W 8/20 |
| 9,985,875 | B1 | 5/2018 | Srinath et al. |
| 10,028,128 | B2 * | 7/2018 | Salkintzis ............ H04W 12/06 |
| 10,484,844 | B2 | 11/2019 | Sudarsan et al. |
| 10,536,326 | B2 | 1/2020 | Mills et al. |
| 10,541,877 | B2 * | 1/2020 | Bainbridge .......... H04L 49/354 |
| 10,616,100 | B2 * | 4/2020 | Garg .................. H04L 47/2441 |
| 10,623,257 | B1 * | 4/2020 | Marquardt .......... H04L 41/0843 |
| 10,772,148 | B2 * | 9/2020 | Kim ..................... H04W 76/20 |
| 10,958,525 | B2 * | 3/2021 | Fang .................... H04L 41/145 |
| 10,986,540 | B2 * | 4/2021 | Bor Yaliniz .......... H04W 76/18 |
| 2002/0007468 | A1 | 1/2002 | Kampe et al. |
| 2002/0023048 | A1 | 2/2002 | Buhannic et al. |
| 2002/0062388 | A1 | 5/2002 | Ogier et al. |
| 2003/0171114 | A1 | 9/2003 | Hastings |
| 2003/0187982 | A1 | 10/2003 | Petit |
| 2004/0131023 | A1 | 7/2004 | Auterinen |
| 2004/0181538 | A1 | 9/2004 | Lo et al. |
| 2004/0193763 | A1 | 9/2004 | Iizuka et al. |
| 2004/0267758 | A1 | 12/2004 | Katsurashima |
| 2005/0120240 | A1 | 6/2005 | Kiwimagi et al. |
| 2005/0136832 | A1 | 6/2005 | Spreizer |
| 2006/0008063 | A1 | 1/2006 | Harnesk et al. |
| 2006/0013191 | A1 | 1/2006 | Kavanagh |
| 2006/0114832 | A1 | 6/2006 | Hamilton et al. |
| 2006/0168655 | A1 | 7/2006 | Grandmaitre et al. |
| 2006/0195607 | A1 | 8/2006 | Naseh et al. |
| 2006/0288404 | A1 | 12/2006 | Kirshnan et al. |
| 2006/0294238 | A1 | 12/2006 | Naik et al. |
| 2007/0101377 | A1 | 5/2007 | Six et al. |
| 2007/0168058 | A1 | 7/2007 | Kephart et al. |
| 2007/0297400 | A1 | 12/2007 | Cameron et al. |
| 2008/0014961 | A1 | 1/2008 | Lipps et al. |
| 2008/0077465 | A1 | 3/2008 | Schimpf et al. |
| 2008/0162984 | A1 | 7/2008 | Kalra et al. |
| 2008/0240082 | A1 | 10/2008 | Feldman et al. |
| 2009/0042537 | A1 | 2/2009 | Gelbman et al. |
| 2009/0109845 | A1 | 4/2009 | Andreasen et al. |
| 2009/0124284 | A1 | 5/2009 | Scherzer et al. |
| 2009/0300173 | A1 | 12/2009 | Bakman et al. |
| 2010/0035587 | A1 | 2/2010 | Bennett |
| 2010/0050172 | A1 | 2/2010 | Ferris |
| 2010/0066804 | A1 | 3/2010 | Shoemake et al. |
| 2010/0128708 | A1 | 5/2010 | Liu et al. |
| 2010/0188975 | A1 | 7/2010 | Raleigh |
| 2010/0238840 | A1 | 9/2010 | Lu et al. |
| 2010/0250751 | A1 * | 9/2010 | Leggette ............... G06F 16/182 709/226 |
| 2010/0281151 | A1 | 11/2010 | Ramankutty et al. |
| 2010/0317331 | A1 | 12/2010 | Miller |
| 2011/0075675 | A1 * | 3/2011 | Koodli ............... H04L 12/1485 370/401 |
| 2011/0131338 | A1 | 6/2011 | Hu |
| 2011/0211583 | A1 | 9/2011 | Seetharaman et al. |
| 2011/0235505 | A1 | 9/2011 | Eswara et al. |
| 2011/0258433 | A1 | 10/2011 | Pulini et al. |
| 2011/0269499 | A1 | 11/2011 | Vikberg et al. |
| 2011/0296232 | A1 | 12/2011 | Izawa |
| 2011/0299386 | A1 | 12/2011 | Negoto et al. |
| 2012/0023360 | A1 | 1/2012 | Chang et al. |
| 2012/0030349 | A1 | 2/2012 | Sugai |
| 2012/0084449 | A1 * | 4/2012 | Delos Reyes ....... H04L 61/1511 709/229 |
| 2012/0106349 | A1 | 5/2012 | Adjakple et al. |
| 2012/0131647 | A1 | 5/2012 | Lan et al. |
| 2012/0143923 | A1 | 6/2012 | Whitney et al. |
| 2012/0144226 | A1 | 6/2012 | Yang et al. |
| 2012/0177005 | A1 | 7/2012 | Liang et al. |
| 2012/0190331 | A1 | 7/2012 | Ahmed et al. |
| 2012/0207104 | A1 | 8/2012 | Liang et al. |
| 2012/0236708 | A1 | 9/2012 | Kompella et al. |
| 2012/0282937 | A1 | 11/2012 | He et al. |
| 2013/0007286 | A1 | 1/2013 | Mehta et al. |
| 2013/0010756 | A1 | 1/2013 | Liang et al. |
| 2013/0054789 | A1 | 2/2013 | Bajamahal |
| 2013/0094395 | A1 | 4/2013 | Lopez et al. |
| 2013/0100815 | A1 | 4/2013 | Kakadia et al. |
| 2013/0121298 | A1 * | 5/2013 | Rune .................. H04W 72/085 370/329 |
| 2013/0173804 | A1 | 7/2013 | Murthy et al. |
| 2013/0188555 | A1 | 7/2013 | Olsson et al. |
| 2013/0212205 | A1 | 8/2013 | Flockhart et al. |
| 2013/0231080 | A1 | 9/2013 | Cheuk et al. |
| 2013/0286821 | A1 | 10/2013 | Liu |
| 2013/0308604 | A1 | 11/2013 | Jiang et al. |
| 2014/0047282 | A1 | 2/2014 | Deb et al. |
| 2014/0098671 | A1 | 4/2014 | Raleigh et al. |
| 2014/0133464 | A1 | 5/2014 | Li et al. |
| 2014/0148165 | A1 | 5/2014 | Serravalle et al. |
| 2014/0160938 | A1 | 6/2014 | Qu |
| 2014/0221025 | A1 | 8/2014 | Chandramouli et al. |
| 2014/0241174 | A1 | 8/2014 | Harris et al. |
| 2014/0359041 | A1 | 12/2014 | Bai |
| 2015/0018131 | A1 | 1/2015 | Siefker |
| 2015/0050924 | A1 | 2/2015 | Gotou |
| 2015/0181431 | A1 | 6/2015 | Zheng et al. |
| 2015/0201364 | A1 | 7/2015 | Yamada et al. |
| 2015/0215768 | A1 | 7/2015 | Dong et al. |
| 2015/0237539 | A1 | 8/2015 | Guo |
| 2015/0271255 | A1 | 9/2015 | Mackay et al. |
| 2015/0280927 | A1 | 10/2015 | Liang et al. |
| 2015/0281466 | A1 * | 10/2015 | Guo ..................... H04M 15/84 455/406 |
| 2015/0334615 | A1 | 11/2015 | Zhang et al. |
| 2016/0028607 | A1 | 1/2016 | Weill et al. |
| 2016/0029047 | A1 * | 1/2016 | Spidella ............... H04L 65/4084 725/93 |
| 2016/0029278 | A1 | 1/2016 | Poikonen et al. |
| 2016/0135143 | A1 | 5/2016 | Won et al. |
| 2016/0270142 | A1 | 9/2016 | Olsson et al. |
| 2016/0285923 | A1 | 9/2016 | Kodaypak |
| 2016/0286385 | A1 | 9/2016 | Ryu et al. |
| 2016/0337841 | A1 | 11/2016 | Won et al. |
| 2016/0353325 | A1 | 12/2016 | Poikonen |
| 2017/0054595 | A1 | 2/2017 | Zhang ................ H04L 41/5051 |
| 2017/0127324 | A1 | 5/2017 | Liang et al. |
| 2017/0141973 | A1 * | 5/2017 | Vrzic ................... H04W 76/11 |
| 2017/0142762 | A1 | 5/2017 | Kedalagudde et al. |
| 2017/0164349 | A1 * | 6/2017 | Zhu ..................... H04W 72/048 |
| 2017/0206115 | A1 * | 7/2017 | Shimojou ........... H04L 41/5054 |
| 2017/0257810 | A1 | 9/2017 | Gandhi |
| 2017/0318450 | A1 * | 11/2017 | Salkintzis ............ H04W 8/02 |
| 2017/0332212 | A1 | 11/2017 | Gage |
| 2017/0332421 | A1 * | 11/2017 | Sternberg .......... H04W 12/0602 |
| 2017/0366399 | A1 * | 12/2017 | Li ....................... H04L 63/102 |
| 2018/0049156 | A1 | 2/2018 | Laha et al. |
| 2018/0077714 | A1 | 3/2018 | Kodaypak et al. |
| 2018/0139797 | A1 | 5/2018 | Chun et al. |
| 2018/0192234 | A1 | 7/2018 | Mohamed et al. |
| 2018/0241793 | A1 * | 8/2018 | Dellosa ............... G06F 9/45558 |
| 2018/0248711 | A1 | 8/2018 | McCann |
| 2018/0270710 | A1 | 9/2018 | Hua et al. |
| 2018/0279115 | A1 | 9/2018 | Tanna |
| 2018/0302877 | A1 * | 10/2018 | Bosch ................. H04W 84/00 |

(56) References Cited

U.S. PATENT DOCUMENTS

| | | |
|---|---|---|
| 2018/0332636 A1 | 11/2018 | Lu et al. |
| 2018/0343601 A1 | 11/2018 | Livanos |
| 2018/0359337 A1* | 12/2018 | Kodaypak .......... H04L 41/0803 |
| 2018/0368202 A1 | 12/2018 | Landais et al. |
| 2019/0007899 A1* | 1/2019 | Vrzic ..................... H04W 16/10 |
| 2019/0021047 A1* | 1/2019 | Zong ...................... H04W 8/26 |
| 2019/0028866 A1 | 1/2019 | Baek et al. |
| 2019/0037409 A1* | 1/2019 | Wang .................... H04W 16/04 |
| 2019/0037441 A1 | 1/2019 | Liu et al. |
| 2019/0053104 A1* | 2/2019 | Qiao ...................... H04L 47/20 |
| 2019/0104503 A1* | 4/2019 | Niu ....................... H04W 72/042 |
| 2019/0116097 A1* | 4/2019 | Shimojou .......... H04L 41/0889 |
| 2019/0124572 A1* | 4/2019 | Park ................... H04W 72/0446 |
| 2019/0140904 A1* | 5/2019 | Huang ............... H04L 41/0816 |
| 2019/0166644 A1* | 5/2019 | Shaw .................. H04L 41/0896 |
| 2019/0190746 A1* | 6/2019 | Lee ......................... H04L 41/20 |
| 2019/0190784 A1* | 6/2019 | Shimojou .......... H04L 41/5054 |
| 2019/0215235 A1* | 7/2019 | Chou ..................... H04L 43/16 |
| 2019/0253962 A1* | 8/2019 | Kiessling ............. H04W 76/10 |
| 2019/0261233 A1* | 8/2019 | Duan ................ H04W 36/0066 |
| 2019/0289622 A1* | 9/2019 | Chatterjee .......... H04W 72/048 |
| 2019/0313216 A1 | 10/2019 | Wong et al. |
| 2019/0313254 A1* | 10/2019 | Zaks ..................... H04W 76/27 |
| 2019/0320332 A1* | 10/2019 | Halabian ............... H04W 24/02 |
| 2020/0022074 A1* | 1/2020 | Shimojou ................ H04M 3/00 |
| 2020/0028896 A1 | 1/2020 | Veldanda et al. |
| 2020/0029273 A1* | 1/2020 | Shimojou ............. H04W 48/18 |
| 2020/0077432 A1* | 3/2020 | Xiong .................... H04L 1/1825 |
| 2020/0089589 A1* | 3/2020 | Chou .................. G06F 11/3006 |
| 2020/0112861 A1* | 4/2020 | Yao ........................ H04W 48/18 |
| 2020/0178139 A1* | 6/2020 | Shimojou ............. H04W 36/12 |
| 2020/0267051 A1* | 8/2020 | Ranjbar ............. G06F 9/45558 |
| 2020/0273314 A1* | 8/2020 | Bordeleau ............. H04W 40/36 |

FOREIGN PATENT DOCUMENTS

| | | |
|---|---|---|
| CN | 101401368 A | 4/2009 |
| CN | 102390184 A | 3/2012 |
| CN | 102555536 A | 7/2012 |
| CN | 202965525 U | 6/2013 |
| CN | 103404181 A | 11/2013 |
| CN | 203311505 U | 11/2013 |
| CN | 103444148 A | 12/2013 |
| CN | 104363572 A | 2/2015 |
| CN | 105099809 A | 11/2015 |
| CN | 103348335 B | 7/2016 |
| CN | 106572517 A | 4/2017 |
| CN | 107105422 A | 8/2017 |
| EP | 1011974 A1 | 6/2000 |
| EP | 1518352 B1 | 8/2007 |
| EP | 2200369 A2 | 6/2010 |
| EP | 2709385 A1 | 3/2014 |
| EP | 3501207 A1 | 6/2019 |
| GB | 2409368 A | 6/2005 |
| JP | 2002-319963 A | 10/2002 |
| JP | 2006-501781 A | 1/2006 |
| JP | 2009-522933 A | 6/2009 |
| JP | 2010-88013 | 4/2010 |
| JP | 2010-141555 A | 6/2010 |
| JP | 2011-508474 A | 3/2011 |
| JP | 2011-259440 A | 12/2011 |
| KR | 10-2010-0070691 A | 6/2010 |
| RU | 2542955 C2 | 2/2015 |
| WO | WO-2004004216 A1 | 1/2004 |
| WO | WO-2007081727 A2 | 7/2007 |
| WO | WO-2009107117 A2 | 9/2009 |
| WO | WO-2010066430 A1 | 6/2010 |
| WO | WO-2013143831 A1 | 10/2013 |
| WO | WO-2013177693 | 12/2013 |
| WO | 2015057034 A1 | 4/2015 |
| WO | WO-2016206118 A1 | 12/2016 |
| WO | WO-2017004158 A1 | 1/2017 |
| WO | WO-2017076088 A1 | 5/2017 |
| WO | WO-2017197589 A1 | 11/2017 |
| WO | 2018006221 A1 | 1/2018 |
| WO | 2018019184 A1 | 2/2018 |
| WO | 2018021873 A1 | 2/2018 |
| WO | 2018034924 A1 | 2/2018 |
| WO | WO-2018222838 | 12/2018 |
| WO | WO-2020023511 A1 | 1/2020 |

OTHER PUBLICATIONS

Hakala, H. et al., "Diameter Credit-Control Application, RFC 4006", Network Working Group, Standards Track, http://tools.ietf.org/html/rfc4006, pp. 1-11, 55-57, 69, 71-75, Aug. 2005 (20 pages).

Rodriguez, et al., "A 3GPP System Architecture Evolution Virtualized Experimentation Infrastructure for Mobility Prototyping (Invited Paper)", Proceedings of the 4th International Conference on Testbeds and Research Infrastructure for the Development of Networks & Communities (Tridentcom), Mar. 18, 2008 (10 Pages).

Taniguchi, et al., "Implementation and Evaluation of Cooperative Proxy Caching System for Video Streaming Services", Technical Report of the Institute of Electronics Information and Communication Engineers, IEICE, Japan, vol. 103(650):13-18, Feb. 5, 2004— English Abstract.

3GPP TR 21.905 v13.1.0 (Jun. 2016), "3rd Generation Partnership Project; Technical Specification Group Services and System Aspects; Vocabulary for 3GPP Specifications (Release 13)", Valbonne, France, Jun. 2016 (65 pages).

3GPP TR 21.905 v15.0.0 (Mar. 2018), "3rd Generation Partnership Project; Technical Specification Group Services and System Aspects; Vocabulary for 3GPP Specifications (Release 15)", Valbonne, France, Mar. 2018 (65 pages).

3GPP TR 23.714 V.14.0.0, "3rd Generation Partnership Project; Technical Specification Group Services and System Aspects; Study on Control and User Plane Separation of EPC Nodes (Release 14)"; Valbonne, France, Jun. 2016 (87 pages).

3GPP TR 23.722 v0.1.1 (Apr. 2017), "3rd Generation Partnership Project; Technical Specification Group Services and System Aspects; Study on Common API Framework for 3GPP Northbound APIs (Release 15)", Valbonne, France, Apr. 2017 (20 pages).

3GPP TS 23.040 v13.2.0 (Sep. 2016), "3rd Generation Partnership Project; Technical Specification Group Core Network and Terminals; Technical Realization of the Short Message Service (SMS) (Release 13)", Valbonne, France, Sep. 2016 (214 pages).

3GPP TS 23.204 v13.1.0 (Jun. 2016), "3rd Generation Partnership Project; Technical Specification Group Services and Systems Aspects; Support of Short Message Service (SMS) over Generic 3GPP Internet Protocol (IP) Access; Stage 2 (Release 13)", Valbonne, France, Jun. 2016 (59 pages).

3GPP TS 23.214 V14.5.0, "3rd Generation Partnership Project; Technical Specification Group Services and System Aspects; Architecture enhancements for control and user plane separation of EPC nodes; Stage 2 (Release 14)", Valbonne, France, Dec. 2017 (84 pages).

3GPP TS 23.236 v12.0.0 (Mar. 2013); "3rd Generation Partnership Project; Technical Specification Group Services and System Aspects; Intra-domain connection of Radio Access Network (RAN) nodes to multiple Core Network (CN) nodes (Release 12)", 3GPP Organizational Partners, Valbonne, France, Jun. 2013 (40 pages).

3GPP TS 23.236 v13.0.0 (Jun. 2015); "3rd Generation Partnership Project; Technical Specification Group Services and System Aspects; Intra-domain connection of Radio Access Network (RAN) nodes to multiple Core Network (CN) nodes (Release 13)", 3GPP Organizational Partners, Valbonne, France, Jun. 2015 (41 pages).

3GPP TS 23.401 V13.9.0 (Dec. 2016), "3rd Generation Partnership Project; Technical Specification Group Services and System Aspects; General Packet Radio Service (GPRS) enhancements for Evolved Universal Terrestrial Radio Access Network (E-UTRAN) access (Release 13)", 3GPP Organizational Partners, Valbonne, France, Dec. 2016 (374 pages).

3GPP TS 23.401v13.5.0 (Dec. 2015), "3rd Generation Partnership Project; Technical Specification Group Services and System Aspects; General Packet Radio Service (GPRS) enhancements for Evolved

(56) References Cited

OTHER PUBLICATIONS

Universal Terrestrial Radio Access Network (E-UTRAN) access (Release 13)", 3GPP Organizational Partners, Valbonne France, Dec. 2015 (337 pages).
3GPP TS 23.682 v. 15.5.0 (Jun. 2018),"3rd Generation Partnership Project; Technical Specification Group Services and System Aspects; Architecture Enhancements to Facilitate Communications with Packet Data Networks and Applications (Release 15)", Valbonne, France, Jun. 2018 (125 pages).
3GPP TS 23.682 v.13.11.0 (Jun. 2018); "3rd Generation Partnership Project; Technical Specification Group Services and System Aspects; Architecture Enhancements to Facilitate Communications with Packet Data Networks and Applications (Release 13)"; Valbonne, France, Jun. 2018 (93 pages).
3GPP TS 23.682 v13.9.0 (Jun. 2017), "3rd Generation Partnership Project; Technical Specification Group Services and System Aspect; Architecture enhancements to facilitate communications with packet data networks and applications (Release 13)", Valbonne, France, Jun. 2017 (93 pages).
3GPP TS 23.682 v14.3.0, "3rd Generation Partnership Project; Technical Specification Group Services and System Aspects; Architecture enhancements to facilitate communications with packet data networks and applications (Release 14)", Valbonne, France, Mar. 2017 (106 pages).
3GPP TS 29.128 v13.3.0 (Dec. 2016), "3rd Generation Partnership Project; Technical Specification Group Core Network and Terminals; Mobility Management Entity (MME) and Serving GPRS Support Node (SGSN) Interfaces for Interworking with Packet Data Networks and Applications (Release 13)", Valbonne, France, Dec. 2016 (47 pages).
3GPP TS 29.338 v13.3.0 (Dec. 2016), "3rd Generation Partnership Project; Technical Specification Group Core Network and Terminals; Diameter Based Protocols to Support Short Message Service (SMS) Capable Mobile Management Entities (MMEs) (Release 13)", Valbonne, France, Dec. 2016 (50 pages).
Apple, 3GPP Draft, "A solution of network slice instance selection and association", Temporary Document, SA WG2 Meeting #S2-116BIS, S2-165127, Aug. 29-Sep. 2, 2016, Sanya, P.R China, Sep. 2016 (5 pages).
Cisco Systems, "Deployment Guide: Cisco IOS IPSEC High Availability", 2005, accessed http://www.cisco.com/en/US/technologies/tk583/tk372/technologies_white_paper0900aecd80278edf.pdf, retrieved Jul. 26, 2018 (16 pages).
European Extended Search Report issued in EP16882635.2. dated Jul. 17, 2019 (13 pages).
Extended European Search Report issued in European Patent Application No. 12825827.4, dated Mar. 6, 2015 (7 pages).
Extended European Search Report issued in European Patent Application No. 16762501.1, dated Oct. 30, 2018 (11 pages).
Giust, F. et al., "ETSI: MEC Deployments in 4G and Evolution Towards 5G", ETSI White Paper No. 24, First Edition, ISBN No. 979-10-92620-18-4, Feb. 2018 (24 pages).
Horak, R., Excerpt from "Internet Protocols", in Telecommunications and Data Communications Handbook, John Wiley & Sons, pp. 663-664, Aug. 2007 (2 pages).
International Search Report and Written Opinion issued by the European Patent Office as International Searching Authority in International Application No. PCT/US2018/035345, dated Aug. 13, 2018 (19 pages).
International Search Report and Written Opinion issued by the European Patent Office as International Searching Authority in International Application No. PCT/US2018/031423, dated Oct. 9, 2018 (18 pages).
International Search Report and Written Opinion issued by the European Patent Office as International Searching Authority in International Application No. PCT/US2019/018666, dated Jul. 10, 2019 (26 pages).
International Search Report and Written Opinion issued by the European Patent Office as International Searching Authority, issued in International Application No. PCT/US19/23138, dated May 29, 2019 (16 pages).
International Search Report and Written Opinion issued by the U.S. Patent and Trademark Office as International Searching Authority for International Application No. PCT/US12/21520 dated May 8, 2012 (8 pages).
International Search Report and Written Opinion issued by the U.S. Patent and Trademark Office as International Searching Authority for International Patent Application No. PCT/US16/21744 dated Jun. 9, 2016 (8 pages).
International Search Report and Written Opinion issued by the U.S. Patent and Trademark Office as International Searching Authority, received for PCT Patent Application No. PCT/US12/25577, dated May 21, 2012, 7 pages.
International Search Report and Written Opinion issued by the U.S. Patent and Trademark Office as Searching Authority, issued in International Application PCT/US16/69092, dated Mar. 29, 2017 (15 pages).
International Search Report and Written Opinion received for PCT Patent Application No. PCT/US2011/055183, dated Mar. 8, 2012, 9 pages.
International Search Report and Written Report issued by the U.S. Patent and Trademark Office as International Searching Authority, issued in PCT/US17/017913, dated Mar. 13, 2017 (14 pages).
3GPP, "Universal Mobile Telecommunications System (UMTS); UTRAN Overall Description (3GPP TS 25.401 version 12.0.0 Release 12)", ETSI TS 125 401 v12.0.0 (Oct. 2014); European Telecommunications Standards Institute, Oct. 2014, pp. 1-64 (65 pages—entire document).
International Search Report and Written Opinion issued by the European Patent Office as International Searching Authority for International Application No. PCT/US19/43037, dated Oct. 29, 2019 (14 pages).
"Office Action Issued in Mexican Patent Application No. MX/a/2020/009728", dated Oct. 6, 2020, 5 Pages.
"First Office Action and Search Report Issued in Chinese Patent Application No. 201980020108.8", dated Nov. 22, 2021, 9 Pages.
"Office Action Issued in Australian Patent Application No. 2019238187", dated Jun. 20, 2022, 3 Pages.
"Notice of Allowance and Search Report Issued in Chinese Patent Application No. 201980020108.8", dated Jun. 1, 2022, 5 Pages. (Partial Translation).
"Office Action and Search report Issued in Russian Patent Application No. 2020134126", dated Jul. 11, 2022, 12 Pages.
"Office Action Issued in Indian Patent Application No. 202047045014", dated Jul. 13, 2022, 6 Pages.
Xin, et al., "Network Slicing Management Solution Based on Network Function Virtualization", In Journal Science Technology and Engineering vol. 17, Issue 29, Oct. 18, 2017, 7 Pages.
"Notice of Allowance Issued in Australian Patent Application No. 2019238187", dated Aug. 12, 2022, 3 Pages.

* cited by examiner

SYSTEMS AND METHODS FOR NETWORK SLICING

CROSS-REFERENCE TO RELATED APPLICATIONS

This application claims priority to U.S. Provisional Application No. 62/645,484, filed Mar. 20, 2018, titled "Systems and Methods for Non-Intrusive Network Slicing", which is incorporated herein by reference in its entirety.

TECHNICAL FIELD

The present disclosure relates generally to routing traffic in mobile networks, and in particular, to systems and methods of routing traffic using network slicing techniques.

BACKGROUND

Some wireless operators have deployed applications known as GTP Proxy functions. A GTP Proxy typically functions as an intermediary node between different mobile network operators (MNO) and is used to aid in interoperability. As an example, a GTP Proxy can be considered an entry point for an operator's users that are roaming in other networks. A roaming network will send all the GTP related traffic, signaling and user plane, to the home GTP Proxy; from the roaming network the GTP Proxy is treated as the selected GGSN or PGW. The GTP Proxy terminates this roaming traffic and subsequently proxy the traffic to the real GGSN or PGW. In this mode of operation, the GTP Proxy hides the topology of the real GGSN/PGW(s), as well it can perform other functions of modifying and enforcement of the GTP related traffic. As the name describes the GTP Proxy always remains as an intermediary for the lifetime of a UE session; e.g. all the UE session traffic flows through the GTP Proxy.

SUMMARY

In some embodiments, a method includes receiving, at a network slicer in a networked system, a first message from a first network node of the networked system; determining, by the network slicer, a destination address from the first message; determining, by the network slicer, if a message type of the first message is a predetermined message type; if the determined message type of the first message is not the predetermined message type, routing the first message to a second network node of the networked system associated with the destination address; and if the determined message type of the first message is the predetermined message type: determining a destination type from the first message, selecting, by the network slicer, a second destination address for the first message based on one or more of a policy of the network slicer or an external policy, the second destination being associated with a third network node of the networked system having a destination type that is the same as the determined destination type, creating, by the network slicer, a new message of the predetermined type including the second destination address, and routing the new message of the predetermined type to the third network node of the networked system associated with the second destination address.

In some embodiments, the predetermined message type is a creation request message.

In some embodiments, the first node is one or more of a mobility management entity (MME), a serving general packet radio services (GPRS) support node (SGSN), serving gateway (SGW), enhanced packet data gateway (ePDG), or a trusted WLAN.

In some embodiments, the determined destination type comprises a gateway general packet radio services (GPRS) support node (GGSN), a serving gateway (SGW), or a packet data network gateway (PGW).

In some embodiments, the selecting the second destination address for the first message based on the one or more of the policy of the network slicer or the external policy comprises: determining, by the network slicer, one or more of a throughput capability level of a user equipment (UE) associated with the first message, an enterprise associated with the UE associated with the first message, a traffic speed of the UE associated with the first message, a security level or requirement of the UE associated with the first message, or an employee status of the owner of the UE associated with the first message; and selecting, by the network slicer, the second destination address associated with one or more of the capability level of the UE, the enterprise of the UE, the traffic speed of the UE, the security level or requirement of the UE, or the employee status of the owner of the UE from a plurality of second destination addresses.

In some embodiments, the selecting the second destination address for the first message based on the one or more of the policy of the network slicer or the external policy comprises determining one or more of an IMSI of a user equipment associated with the first message, location of the user equipment associated with the first message, access point name (APN) associated with the first message, an IMEI identification number of the user equipment associated with the first message, a Radio Access Technology type associated with the first message, or a timestamp of the first message.

In some embodiments, the method further includes receiving, by the network slicer, a response message from the third network node; and creating, by the network slicer, a new response message including: the destination address associated with the second network node as a source address of the new response message, and an indication of the second destination address associated with the third network node in the message content of the new response message.

In some embodiments, the method further includes storing, at the network slicer, one or more of an address associated with the first network node or the destination address prior to the receiving the response message from the third network node; and deleting, by the network slicer, the stored one or more of the address associated with the first network node or the destination address after the creating the new response message.

In some embodiments, the method further includes indicating to a next hop router by the network slicer that a router associated with the network slicer has a lower routing cost to the second network node than an expected routing cost from other routers in the networked system to the second network node prior to the receiving the first message, wherein the lower routing cost to the second network node is lower than an actual routing cost to the second network node.

In some embodiments, a method includes receiving, at a network slicer in a networked system, a creation request message from a first network node, the creation request message having as a first destination address an address associated with the network slicer; determining a destination type from the creation request message; selecting, by the network slicer, a second destination address for the creation request message based on one or more of a policy of the network slicer or an external policy, the destination being associated with a second network node of the networked system having a destination type that is the same as the determined destination type; creating, by the network slicer, a new creation request message including the second destination address and the message content from the creation request message; and routing the new creation request message to the second network node of the networked system associated with the second destination address.

In some embodiments, the method further includes receiving, by the network slicer, a response message from the second network node; and creating, by the network slicer, a new response message including the address associated with the second network node in the message content of the new response message and the address associated with the network slicer as the source address.

In some embodiments, the method further includes storing, at the network slicer, one or more of the address associated with the first network node or the second destination address prior to the receiving the response message from the second network node; and deleting, by the network slicer, the stored one or more of the address associated with the first network node or the second destination address after the creating the new response message.

In some embodiments, the first node is one or more of a mobility management entity (MME), a serving general packet radio services (GPRS) support node (SGSN), serving gateway (SGW), enhanced packet data gateway (ePDG), or a trusted WLAN.

In some embodiments, the determined destination type comprises a gateway general packet radio services (GPRS) support node (GGSN), a serving gateway (SGW), or a packet data network gateway (PGW).

In some embodiments, the selecting the second destination address for the creation request message based on the one or more of the policy of the network slicer or the external policy comprises: determining, by the network slicer, one or more of a throughput capability level of a user equipment (UE) associated with the first message, an enterprise associated with the UE associated with the first message, a traffic speed of the UE associated with the first message, a security level or requirement of the UE associated with the first message, or an employee status of the owner of the UE associated with the first message, and selecting, by the network slicer, the second destination address associated with one or more of the capability level of the UE, the enterprise of the UE, the traffic speed of the UE, the security level or requirement of the UE, or the employee status of the owner of the UE from a plurality of second destination addresses.

In some embodiments, the method further includes indicating to a domain name system of the networked system that the address associated with the network slicer has a higher priority than at least the second network node prior to the receiving the creation request message.

In some embodiments, a network slicer in a networked system includes: a processor; and a storage medium having instructions contained thereon that cause the processor to perform the following steps: receive, at the network slicer in the networked system, a first message from a first network node of the networked system; determine, by the network slicer, a destination address from the first message; determine, by the network slicer, if a message type of the first message is a predetermined message type; if the determined message type of the first message is not the predetermined message type, route the first message to a second network node of the networked system associated with the destination address; and if the determined message type of the first message is the predetermined message type: determine a destination type from the first message, select, by the network slicer, a second destination address for the first message based on one or more of a policy of the network slicer or an external policy, the second destination being associated with a third network node of the networked system having a destination type that is the same as the determined destination type, create, by the network slicer, a new message of the predetermined type including the second destination address, and route the new message of the predetermined type to the third network node of the networked system associated with the second destination address.

In some embodiments, the predetermined message type is a creation request message.

In some embodiments, the first node is one or more of a mobility management entity (MME), a serving general packet radio services (GPRS) support node (SGSN), serving gateway (SGW), enhanced packet data gateway (ePDG), or a trusted WLAN.

In some embodiments, the determined destination type comprises a gateway general packet radio services (GPRS) support node (GGSN), a serving gateway (SGW), or a packet data network gateway (PGW).

In some embodiments, the selecting the second destination address for the first message based on the one or more of the policy of the network slicer or the external policy comprises causing the processor to: determine, by the network slicer, one or more of a throughput capability level of a user equipment (UE) associated with the first message, an enterprise associated with the UE associated with the first message, a traffic speed of the UE associated with the first message, a security level or requirement of the UE associated with the first message, or an employee status of the owner of the UE associated with the first message, and select, by the network slicer, the second destination address associated with one or more of the capability level of the UE, the enterprise of the UE, the traffic speed of the UE, the security level or requirement of the UE, or the employee status of the owner of the UE from a plurality of second destination addresses.

In some embodiments, the selecting the second destination address for the first message based on the one or more of the policy of the network slicer or the external policy comprises determining one or more of an IMSI of a user equipment associated with the first message, location of the user equipment associated with the first message, access point name (APN) associated with the first message, an IMEI identification number of the user equipment associated with the first message, a Radio Access Technology type associated with the first message, or a timestamp of the first message.

In some embodiments, the processor is further caused to: receive, by the network slicer, a response message from the third network node; and create, by the network slicer, a new response message including: the destination address associated with the second network node as a source address of the new response message, and an indication of the second destination address associated with the third network node in the message content of the new response message.

In some embodiments, the processor is further caused to: store, at the network slicer, one or more of an address associated with the first network node or the destination address prior to the receiving the response message from the third network node; and delete, by the network slicer, the stored one or more of the address associated with the first network node or the destination address after the creating the new response message.

In some embodiments, the processor is further caused to indicate to a next hop router by the network slicer that a router associated with the network slicer has a lower routing cost to the second network node than an expected routing cost from other routers in the networked system to the second network node prior to the receiving the first message, wherein the lower routing cost to the second network node is lower than an actual routing cost to the second network node.

In some embodiments, a network slicer in a networked system includes: a processor; and a storage medium having instructions contained thereon that cause the processor to perform the following steps: receive, at the network slicer in the networked system, a creation request message from a first network node, the creation request message having as a first destination address an address associated with the network slicer; determine a destination type from the creation request message; select, by the network slicer, a second destination address for the creation request message based on one or more of a policy of the network slicer or an external policy, the destination being associated with a second network node of the networked system having a destination type that is the same as the determined destination type; create, by the network slicer, a new creation request message including the second destination address and the message content from the creation request message; and route the new creation request message to the second network node of the networked system associated with the second destination address.

In some embodiments, the processor is further caused to: receive, by the network slicer, a response message from the second network node; and create, by the network slicer, a new response message including the address associated with the second network node in the message content of the new response message and the address associated with the network slicer as the source address.

In some embodiments, the processor is further caused to: store, at the network slicer, one or more of the address associated with the first network node or the second destination address prior to the receiving the response message from the second network node; and delete, by the network slicer, the stored one or more of the address associated with the first network node or the second destination address after the creating the new response message.

In some embodiments, the first node is one or more of a mobility management entity (MME), a serving general packet radio services (GPRS) support node (SGSN), serving gateway (SGW), enhanced packet data gateway (ePDG), or a trusted WLAN.

In some embodiments, the determined destination type comprises a gateway general packet radio services (GPRS) support node (GGSN), a serving gateway (SGW), or a packet data network gateway (PGW).

In some embodiments, the selecting the second destination address for the creation request message based on the one or more of the policy of the network slicer or the external policy comprises causing the processor to: determine, by the network slicer, one or more of a throughput capability level of a user equipment (UE) associated with the first message, an enterprise associated with the UE associated with the first message, a traffic speed of the UE associated with the first message, a security level or requirement of the UE associated with the first message, or an employee status of the owner of the UE associated with the first message, and select, by the network slicer, the second destination address associated with one or more of the capability level of the UE, the enterprise of the UE, the traffic speed of the UE, the security level or requirement of the UE, or the employee status of the owner of the UE from a plurality of second destination addresses.

In some embodiments, the processor is further caused to indicate to a domain name system of the networked system that the address associated with the network slicer has a higher priority than at least the second network node prior to the receiving the creation request message.

BRIEF DESCRIPTION OF FIGURES

Various objectives, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1:
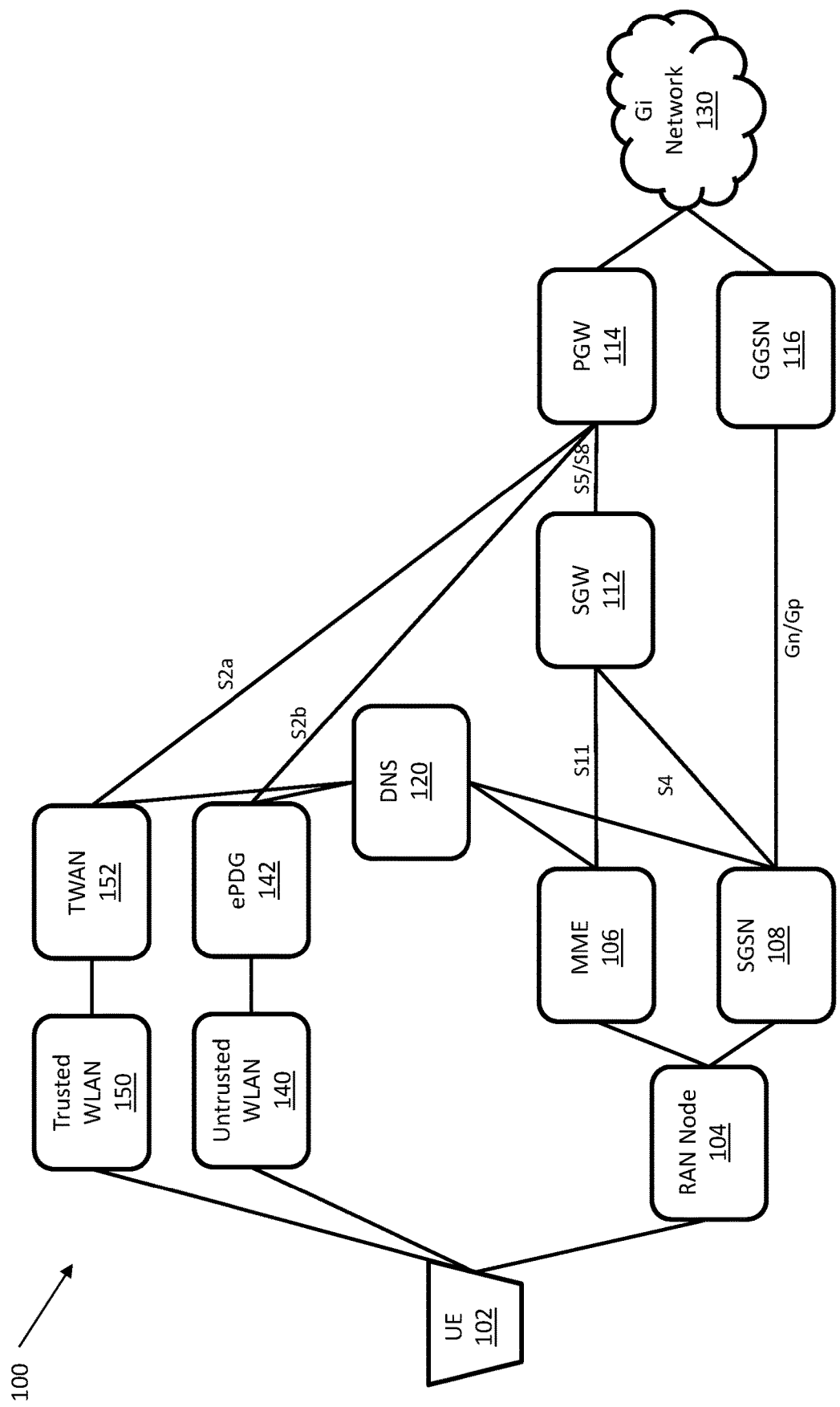
FIG. 1 is a system diagram showing a networked system.

Systems and methods are disclosed to provide wireless network operators the ability to slice the core network into different slices such that control plane and user plane functionality can be segregated for different group of mobile users. In some embodiments, the systems and methods described herein are accomplished without impacting the configurations of any of existing network functions (e.g., the function of an MME, SGSN, DNS server, serving gateway (SGW), packet data network gateway (PGW), GGSN, TWAN, and ePDG, described below). In some embodiments, only updates to the DNS servers are required without impacting other network functions.

In some embodiments, network slicing techniques described herein include a flexible application that determines the correct Gateway (SGW, PGW, and/or GGSN, collectively referred to as "right side" network elements) slice to use for the UE/device PDN/PDP sessions. The application can derive, through inspection and/or receipt of the operator GTP-C signaling traffic from the MME, SGSN, SGW, TWAN, and/or ePDG (collectively referred to as "left side" network elements) to the right side elements and based on how the application is configured, the correct network slice to which to route future communications. According to some embodiments, such functionality can be achieved when the network slicer is inserted between at least one left side element and associated right side elements. In some embodiments where the network slicer is located between the SGW (left) and the PGW (right), the network slicer only selects a PGW for future communications. Further, the SGW learns of the originally selected PGW from the MME/SGSN.

In contrast to the GTP Proxies described above, embodiments of the systems and methods described herein take a network slicing approach to flexibly classify a UE, selecting the correct network slice to anchor the UE session, establishing the Gateway association, and subsequently removing itself from the UE session traffic flow. This process can be accomplished in a non-intrusive or minimally intrusive manner such that existing mobile operator core network nodes are unaware of the presence of this new slicing application.

In some non-intrusive embodiments, a network slicer can be introduced without changes to the left side network elements or the DNS server. The network slicer can be inserted between one or more left side network elements and one or more right side network elements. The network slicer can inform a next hop router between one or more of the one or more left side network elements that it has a lower routing cost to one or more of the one or more right side network elements than other routers in the networked system that are capable of routing to the one or more of the one or more right side network elements. Accordingly, the network slier can intercept messages between the one or more of the one or more left side network elements and the one or more of the one or more right side network elements without updating a DNS server or instructing the one or more left side elements that messages should be directed to the network slicer. As described in more detail below, the non-intrusive network slicer can then inspect the messages to identify creation request messages. When creation requests messages are received, the non-intrusive network slicer can select a network slice that can, but is not necessarily, be different from the network slice selected by a left side element in the original creation request message. The non-intrusive network slicer may also receive non-creation response messages, which the non-intrusive network slicer can route in a manner consistent with routers that do not perform network slicing functions.

In some minimally intrusive embodiments, an indication can be made to a DNS server that an IP address associated with the minimally intrusive network slicer has a higher priority than one or more right side elements. Accordingly, when one or more left side elements queries the DNS server, the one or more left side elements receive an indication that the minimally intrusive network slicer has a higher priority than the right side elements to which creation messages would otherwise be routed. As described in more detail below, the one or more left side elements can then direct creation request messages to the IP address associated with the minimally intrusive network slicer. The minimally intrusive network slicer can then apply techniques describe herein to forward a creation network to a selected network slice (e.g., one or more right side elements), and return a response to the one or more left side elements that informs the one or more left side elements of which slice to direct future messages. Such future messages can be routed directly to the selected slice in a way that bypasses the network slicer. Thus, given the explanations herein, the terms "non-intrusive" and "minimally intrusive" are merely used to identify the various embodiments and do not impose any further limitations on the scope of the invention.

In some embodiments, a network slicer is introduced as a layer 3 router on its interface facing the MME, SGSN, SGW, TWAN, or ePDG, and on the interface towards the other network functions, the network slicer acts as both as a router as well as an IP host. As described in more detail below, this allows for the introduction of the network slicer without disturbing other network functions in some non-intrusive embodiments. In some minimally intrusive embodiments, the network slicer can be made visible on the DNS server to act as an SGW, GGSN, and/or a PGW.

In some non-intrusive embodiments, when session management packets (e.g., GTP-C) from the MME, SGSN are sent to the SGWs or the GGSNs, or from SGW, TWAN or ePDG to the PGW, the network slicer informs a next hop router in front of the MME, SGSN, SGW, TWAN, and ePDG or the MME, SGSN, SGW, TWAN, and ePDG directly that it can reach the SGW, PGW, or GGSN at a lower routing cost relative to other routers in the network capable of reaching the SGW, PGW, or GGSN.

In some embodiments, the network slicer inspects incoming packets and determine if it should apply a slicing function on the incoming packets. For GTP-C packets that are not Create Session Requests (e.g., GTPv2) or Create PDP Context Request (e.g., GTPv1), the network slicer routes the packets to their destination as a router. For Create Session Requests or Create PDP Context Requests, the network slicer applies information (such as UE identities, Location, APN etc.) from the request along with locally configured policies and policies retrieved from external policy database to select which network slice should be used for the particular session. DNS servers used by the MME, SGSN, TWAN, and/or ePDG can also be sources of policy information.

In some minimally intrusive embodiments, the MME/SGSN can discover the network slicer in the same way the SGW, PGW or GGSN might be discovered, for example from a DNS server. The TWAN or ePDG can discover the network slicer in the same way the PGW might be discovered, for example from the DNS servers. The network slicer can receive the Create Session Request (e.g., via GTPv2) or Create PDP Context Request (e.g., GTPv1) without leveraging a method of altering routing cost. Once the create request packet is received, the rest of the processing can be performed in a similar way to non-intrusive embodiments.

In some embodiments, once a slice is selected, the network slicer creates a new Create Session Request or Create PDP Context Request using a local host IP address and sends the request to the selected slice, which can be a different slice from what the MME, SGSN, TWAN, and/or ePDG has selected. This allows the response to come back to the network slicer, which forms a Create Session Response or Create PDP Context Response to send back to the MME, SGSN, TWAN, and/or ePDG. The source IP address used in this case is set to match the destination IP address of the original request.

FIG. 1 is a system diagram showing a networked system. FIG. 1 shows user equipment (UE) 102, RAN Node 104, mobility management entity (MME) 106, serving general packet radio services (GPRS) support node (SGSN) 108, serving gateway (SGW) 112, packet data network gateway (PGW) 114, gateway GPRS support node (GGSN) 116, domain name system (DNS) 120, Gi network 130, untrusted wireless access local area network (WLAN) 140, enhanced packet data gateway (ePDG) 142, trusted WLAN 150, and trusted WLAN access network (TWAN) 152.

UE 102 connects to a networked system 100 through the RAN Node 104, which can be an evolved NodeB (eNodeB) in 4G network, or a Radio Network Controller (RNC) for 3G or a Base Station Subsystem (BSS) for 2G. UE 102 includes computing devices configured to connect to a mobile data network (e.g., mobile phones, tablets, laptops). RAN Node 104 is a radio part of a cell site. A single RAN Node 104 may contain several radio transmitters, receivers, control sections and power supplies. RAN Node 104 can be backhauled to MME 106 and SGSN 108. Backhaul is a process of transferring packets or communication signals over relatively long distances to a separate location for processing, for example at a data center maintained by a network operator. SGSN 108 routes and forwards user data packets while also acting as the mobility anchor for a user plane during inter-RAN Node handovers. MME 106 is a control node in the networked system 100. MME 106 handles mobility and session management for the UE 102 while it is in the 4G network. SGSN 108 and GGSN 116 are used to route traffic in a 2G or 3G system while MME 106, SGW 112, and PGW 114 are used to route traffic in a 4G/EPC system. UE 102 can obtain network access via two different types of WLAN. As shown in FIG. 1, WLAN 150 is trusted by the network operator, while WLAN 140 is not trusted by the network operator. WLANs 140, 150 link devices using wireless communications to form local area networks (LANs), for example, in limited areas. The WLANs 140, 150 can be integrated into the networked system 100 via ePDG 142 and TWAN 152, respectively, for communications between the WLANs 140, 150 and PGW 114 over the S2b and S2a interfaces, respectively. For the trusted WLAN 150, UE 102 can obtain network access using TWAN 152 and PGW 114. For the untrusted WLAN 140, UE 102 can obtain network access using ePDG 142 and PGW 114.

When UE 102 attaches to the network, multiple control messages are exchanged between network elements in order to create a data session (e.g., 3G session, 4G session) and provide data connectivity to the UE 102. As explained above, RAN Node 104 can be backhauled to MME 106/SGSN 108. MME 106/SGSN 108 routes and forwards packets (e.g., user plane packets from SGSN 108 to GGSN 116) and/or sends other messages to SGW 112, PGW 114, and GGSN 116. In some network implementations, GGSN acts a serving node in a general packet radio service (GPRS) network, and PGW acts as a serving node in an evolved packet core (EPC) network. PGW 114 and GGSN 116 route packets to and from Gi Network 130. PGW 114 can also route packets to and from the Trusted WLAN 150 and Untrusted WLAN 140 via TWAN 152 and ePDG 142, respectively. Gi Network 130 can include any enterprise or origin servers. Gi Network 130 can connect to the internet or any other third-party server.

DNS 120 translates domain names into IP addresses and can be queried by any of the network nodes described above. DNS 120 can be implemented in servers connected to network nodes over an internal or external network connection. Each of the network nodes described above can be configured to communicate with DNS 120.

As discussed above, a GTP Proxy can sit between, for example, the SGW 112 and the PGW 114 and/or the SGSN 108 and the GGSN 116. However, as discussed above, GTP proxies can be intrusive.

Figure 2A:
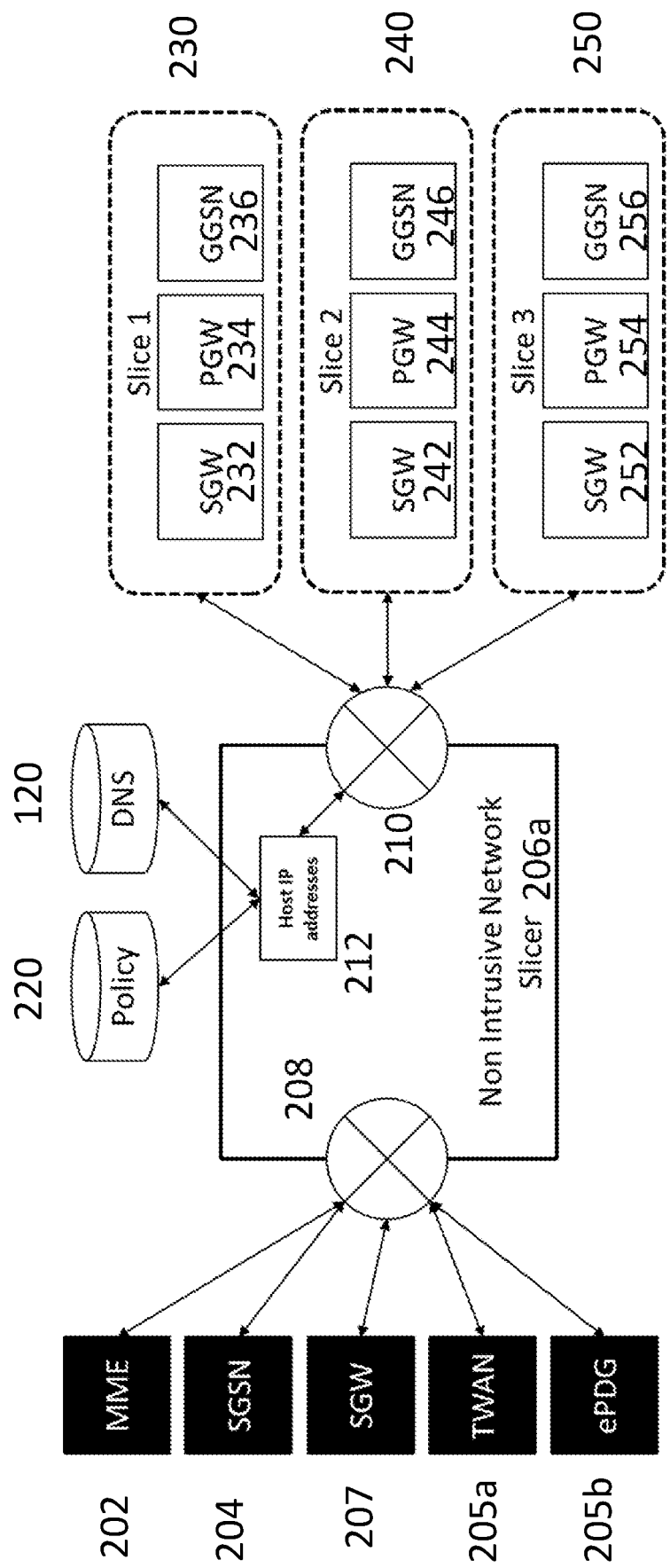
FIGS. 2A and 2B are system diagrams showing networked systems, according to some embodiments of the present disclosure.

FIG. 2A is a system diagram showing a networked system with a non-intrusive network slicer, according to some embodiments of the present disclosure. FIG. 2A shows mobile management entity 202, Serving GPRS Support Node (SGSN) 204, TWAN 205a, ePDG 205b, network slicer 206, SGW 207, router 208, router 210, host IP addresses 212, policy server/database 220, domain name system (DNS) server/database 120 slice 1 230, serving gateway (SGW) 232, packet data network gateway (PGW) 234, Gateway GPRS Support Node (GGSN) 236, slice 2 240, serving gateway (SGW) 242, packet data network gateway (PGW) 244, Gateway GPRS Support Node (GGSN) 246, slice 3 250, serving gateway (SGW) 252, packet data network gateway (PGW) 254, and Gateway GPRS Support Node (GGSN) 256.

MME 202 functions similarly to or the same as MME 106 as shown in FIG. 1 and described in the accompanying text and SGSN 204 functions similarly to SGSN 108 as shown in FIG. 1 and described in the accompanying text. SGW 207, 232, 242, 252; PGW 234, 244, 254; GGSN 236, 246, 256 also function similarly to SGW 112, PGW 114, and GGSN 116 as shown in FIG. 1 and described in the accompanying text, and TWAN 205a and ePDG 205b function similarly to TWAN 152 and ePDG 142, respectively, as shown in FIG. 1 and described in the accompanying text. Note that although only singular MME 202, SGSN 204, SGW 207, TWAN 205a and ePDG 205b are shown in FIG. 2A that sit at the left side of the network slicer 206a, multiple of each of these elements can be included and can be connected to one or more SGWs 232, 242, 252, PGWs 234, 244, 254, and/or GGSNs 236, 246, 256. As shown in FIG. 2A, an SGW can be on both sides of the network slicer due to the interface it supports (S4/S11 on one side and S5/S8 on the other side). A network slicer 206a can be introduced into the network to route traffic to and from "access-network facing nodes to data-network network facing nodes" (e.g., from left side elements to right side elements).

Network slicer 206a can include router 208 for transmitting and receiving packets between the network slicer 206a and MME 202, SGSN 204, SGW 207, TWAN 205a, ePDG 205b, and router 210 for transmitting and receiving packets between the network slicer 206a and SGWs 232/242/252, PGWs 234/244-254, and GGSNs 236/246/256. For network slicer 206a, the router 208 may inform the next hop router or MME, SGSN, SGW, TWAN, and ePDG directly that it has the lowest routing costs as discussed above. Thus, all traffic, regardless of type, may be routed to network slicer 206a regardless of type. As shown in FIG. 2A, network slicer can consult one of policy 220 and DNS 120 for a policy associated with a received packet. In particular, network slicer 206a can inspect Create Session Requests or Create PDP Context Requests and their corresponding responses to determine if modification is required. Network slicer 206a routes other GTP-C packets through to the network slices without any inspection or processing. Packets from router 208 are sent to router 210 and vice versa. Policy 220 can be local to the network slicer 206a, an external database, or a combination of the two. Policy 220, which is explained in more detail throughout the present disclosure, can include various rules applied by the network slicer 206a.

For example, and as described in more detail below, for an incoming Create Session Request (or Create PDP Context Request), the request can include the MME, SGSN, SGW, TWAN, or ePDG's IP as the source IP address and the IP address of the SGW, PGW or GGSN selected by the MME, SGSN, TWAN, or ePDG as the destination IP address. In some embodiments, the network slicer 206a may determine that a different SGW, PGW, or GGSN should be used based on policy 220. Examples of such scenarios include, but are not limited to when an operator has a dedicated slice for a particular enterprise customer (when a UE is detected to belong to the enterprise, the network slicer directs the request to the designated slice for the customer), when one slice or more slices are used for high security users (the network slicer can be configured to detect such users, for example, based on identifying characteristics, and direct request therefrom to the one or more secure slices), and when a new slice is considered to be experimental for a particular function such as high throughput (the operator may want to test that slice with particular UEs, such as internal employee devices, and the network slicer can direct employee devices to that slice using the slicer). An exemplary gateway-selection policy can list a specific right side element or a list of right side elements associated with a predetermined group of users. In another exemplary gateway-selection policy, the policy can list one or more characteristics of a right side element to be selected (e.g., support for high speed data) for particular users, session types, etc. An exemplary admission-priority policy can prioritize users or groups of users when the network slicer is overloaded. For example, Create Session Requests from a particular group or groups of lower priority users may be ignored if the network slicer is overloaded (or above a threshold usage) such that the network slicer does not select new network slices for the lower priority users. When the network slicer 206a determines a different SGW, PGW or GGSN should be used, the network slicer 206a replaces the source IP using its own host IP 212 and the destination IP using that of the SGW or GGSN selected by the Network Slicer based on its local policy. Since the source IP is that of the network slicer 206a, the response from the SGW, PGW or GGSN will come back to the network slicer 206a. At that time, it replaces the destination IP using that of the MME, SGSN, SGW, TWAN, or ePDG from which the original request was received, and the source IP using the IP Address of the SGW or GGSN selected by the MME, SGSN, TWAN, or ePDG such that the source IP address of the response is the destination IP address of the original request.

Slices 230, 240, 250 refer to network slices, each of which is a partitioning of a network infrastructure into multiple network infrastructures. For example, slices 230, 240, 250 can all be running on the same hardware platform, but implemented as separate logical networks in software. The slices can also be implemented in different hardware platform or different virtualization infra-structures.

Figure 2B:
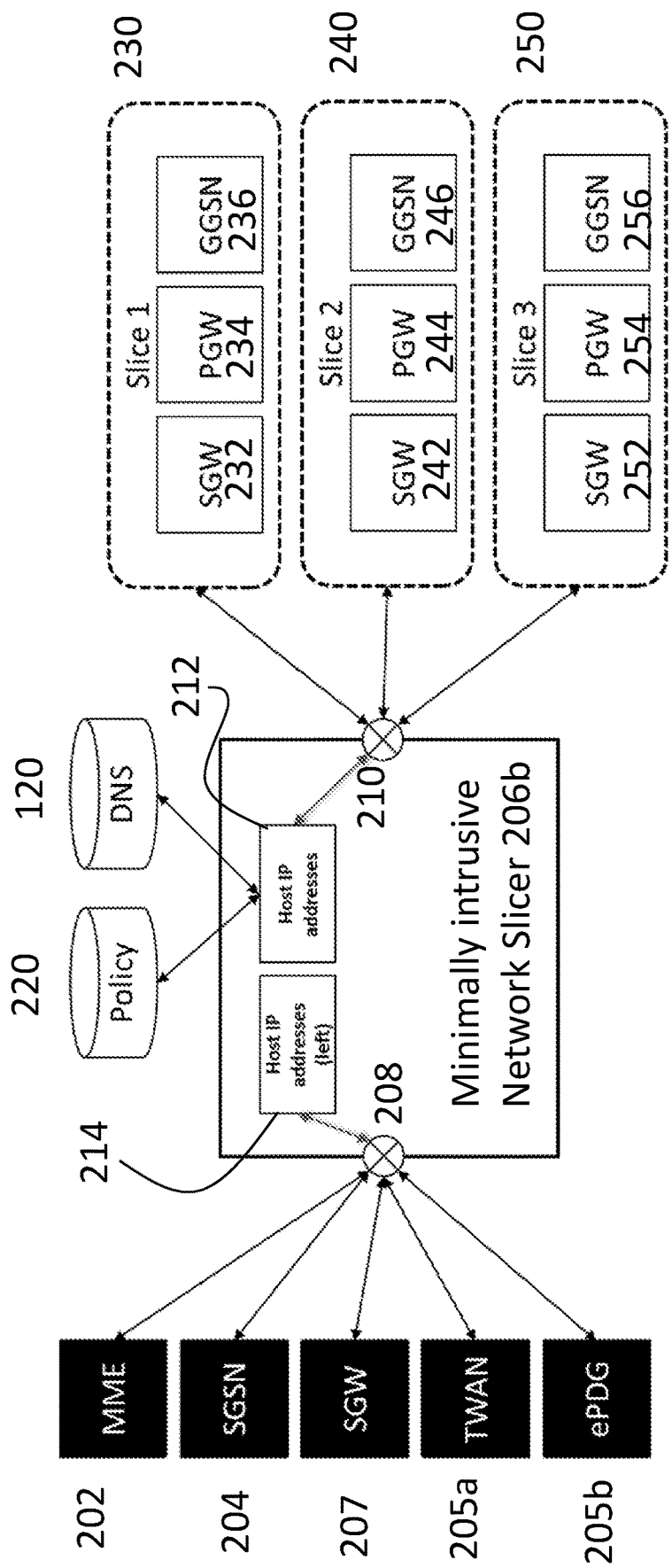

FIG. 2B is a system diagram showing a networked system with a minimally-intrusive network slicer, according to some embodiments of the present disclosure. Elements in FIG. 2B with similar numbers to FIG. 2A function in similar ways as described herein. In some embodiments, FIG. 2B differs from FIG. 2A in that a minimally-intrusive network slicer 206b includes a host IP address 214. As shown in FIG. 2B, host IP address 214 of the minimally-intrusive network slicer 206b is visible to MME 202, SGSN 204, SGW 207, TWAN 205a, and ePDG 205b. Unlike the embodiment shown in FIG. 2A, MME 202, SGSN 204, SGW 207, TWAN 205a, and ePDG 205b may be modified to transmit creation session request messages directly to the host IP address 214 of the minimally-intrusive network slicer 206b. As discussed above with reference to non-intrusive network slicer 206a, minimally-intrusive network slicer 206b can determine the appropriate anchor node from the available network slices (e.g., by applying various policies 220 described throughout the present disclosure), and forward the message to the appropriate node by replacing its own IP 214 in the message with the destination IP of the appropriate network element in the network slices 230, 240, 250. The network slicer 206b can be referred to as minimally intrusive because the MMEs, SGSNs, SGW, TWANs, and ePDGs first send a create session request directed to the host IP address 214 of the network slicer 206b, whereas the initial create session requests discussed with reference to FIG. 2A are directed at network element(s) in the network slices 230, 240, or 250 but routed to network slicer because the network slicer informs the next hop routers or MME, SGSN, SGW, TWAN, and ePDG that it has lower routing costs relative to other routers to the right side elements. However, the minimally-intrusive network slicer 206b may nonetheless be considered stateless because session state information is not maintained on the network slicer, like in non-intrusive embodiments. This is because both the non-intrusive network slicer 206a and the minimally intrusive network slicer 206b do not need to maintain any stored information about received or forwarded messages after sending a return message to the original left side element. Thus, in some embodiments, only the left and/or right side network elements maintain session state information, while the network slicer does not. However, in other embodiments, the network slicer may record, keep, or maintain session state information, or may otherwise function as a "stateful" network element. In some embodiments, for non-creation requests, the network slicer 206b does not receive any traffic because MMEs, SGSNs, SGWs, TWANs, and ePDGs route directly to the selected slice that is indicated to the left side element in a return message from the networks slicer 206b, rather than directly to the host IP address 214 of the network slicer 206b and because the network slicer 206b may be implemented in a manner that does not inform next hop routers that the network slicer 206b has lower routing costs to the right side elements.

Figure 3:
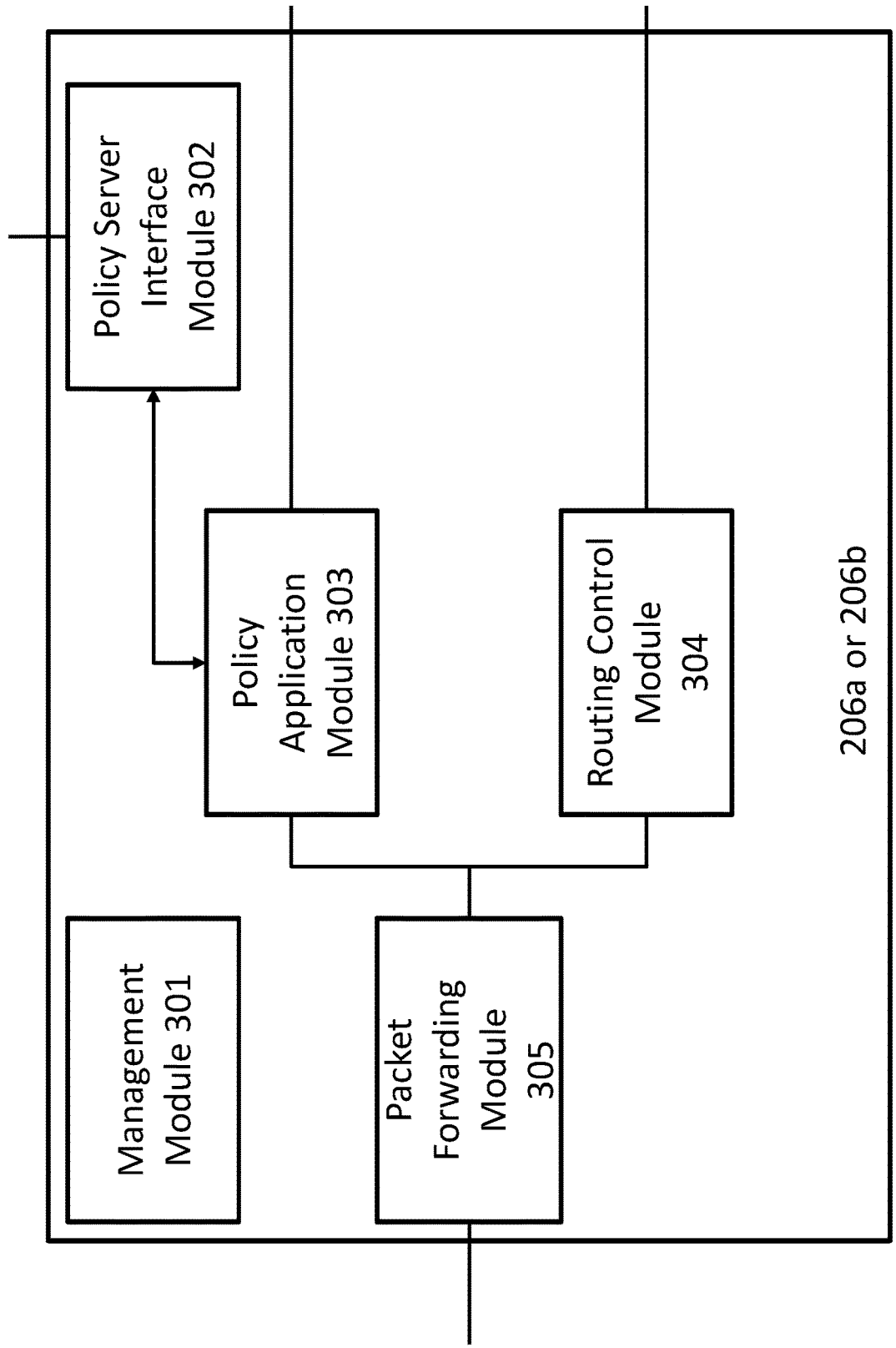
FIG. 3 is a diagram showing a network slicer, according to some embodiments of the present disclosure.

FIG. 3 is a diagram showing a minimally or non-intrusive network slicer, according to some embodiments of the present disclosure. FIG. 3 shows a Management module 301, a Policy Server Interface module 302, a Policy Application module 303, a Routing Control module 304 and a Packet Forwarding Module 305.

Management module 301 provides configuration management, operation management, performance management (e.g., tracking a number of requests received, number or responses received, number of requests that have been redirected, number of responses that have been redirected, etc.) and fault management function (e.g., monitoring the health of the nodes belong to various slices, monitoring the connectivity to the policy database, generating alarms when peer nodes in the slices are down or the DB is not accessible, etc.) for the network slicer 206a or 206b. Management module 301 allows a user to control and monitor the network slicer 206a or 206b, including the various modules within the network slicer 206a or 206b.

Policy application module 303 performs the application of the network slicing policy to determine the right SGW, PGW and GGSN to use for a Create Session Request or Create PDP Context Request being processed. In some embodiments, policy application module 303 uses locally configured policy, which can be stored in the policy application module 303 or a storage in the network slicer 206a or 206b, as well as policies received from external servers via the Policy Server Interface module 302 to external servers, such as a subscriber policy repository (SPR), which can store subscribers' privileges and grouping information such as enterprise customer status, security level, etc.

Packet Forwarding module 305 inspects incoming packets. For Create Session Request or Create PDP Context Request messages and their corresponding response messages, the Packet Forwarding module sends them to the Policy application module 303. In some non-invasive embodiments, for other packets, the Packet Forwarding module 305 simply forwards them to the appropriate network interface based on forwarding rules determined by the Routing Control module 304, such as IP 10.10.2.4 mask 255.255.0.0 interface port1 or IP 10.20.3.1 mask 255.255.0.0 interface port2.

Figure 4A:
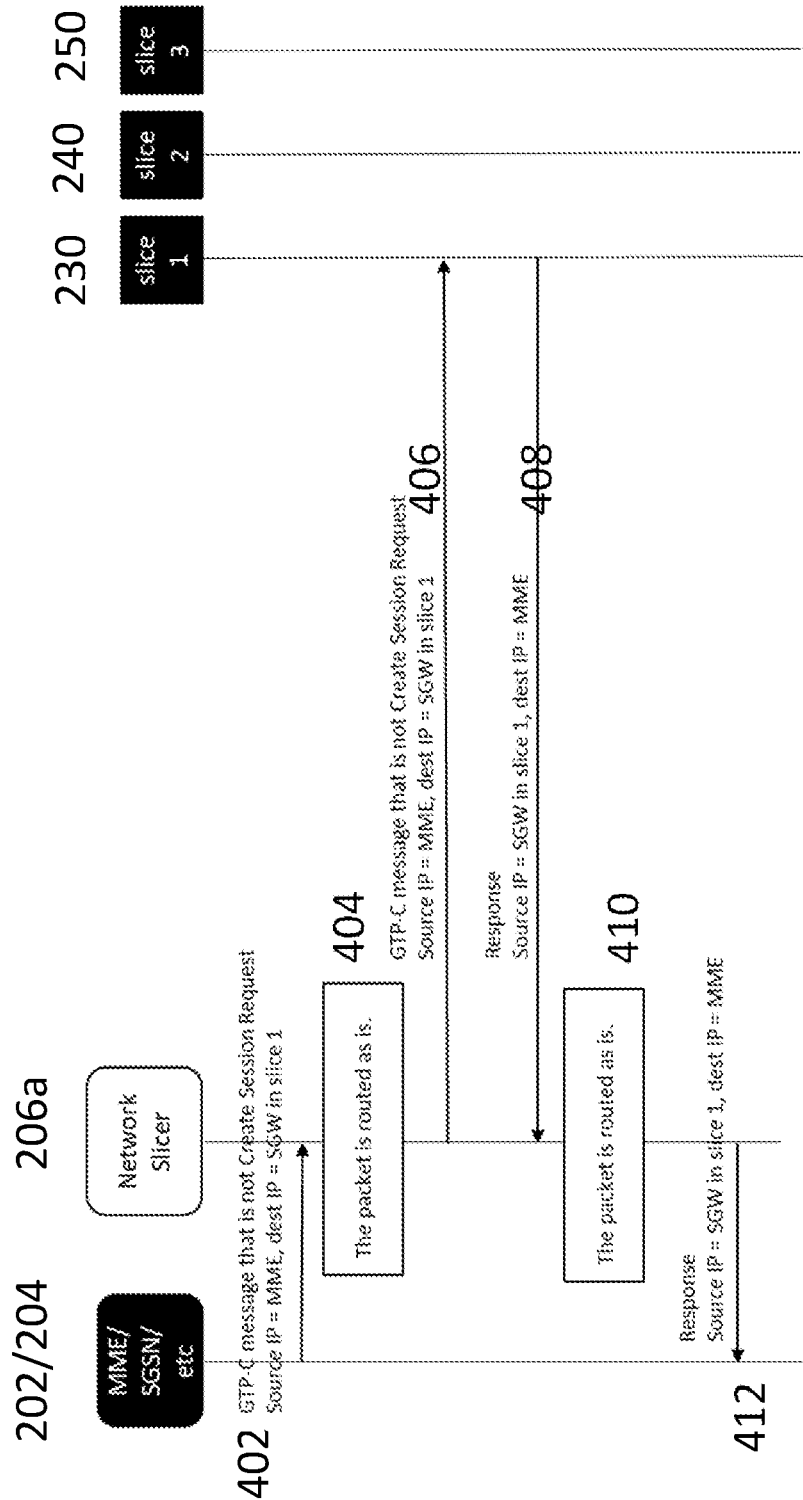
FIGS. 4A and 4B are flow charts showing message flows for GTP-C messages that are not Create Session Requests or Create PDP Context Requests, according to some embodiments of the present disclosure.
Figure 4B:
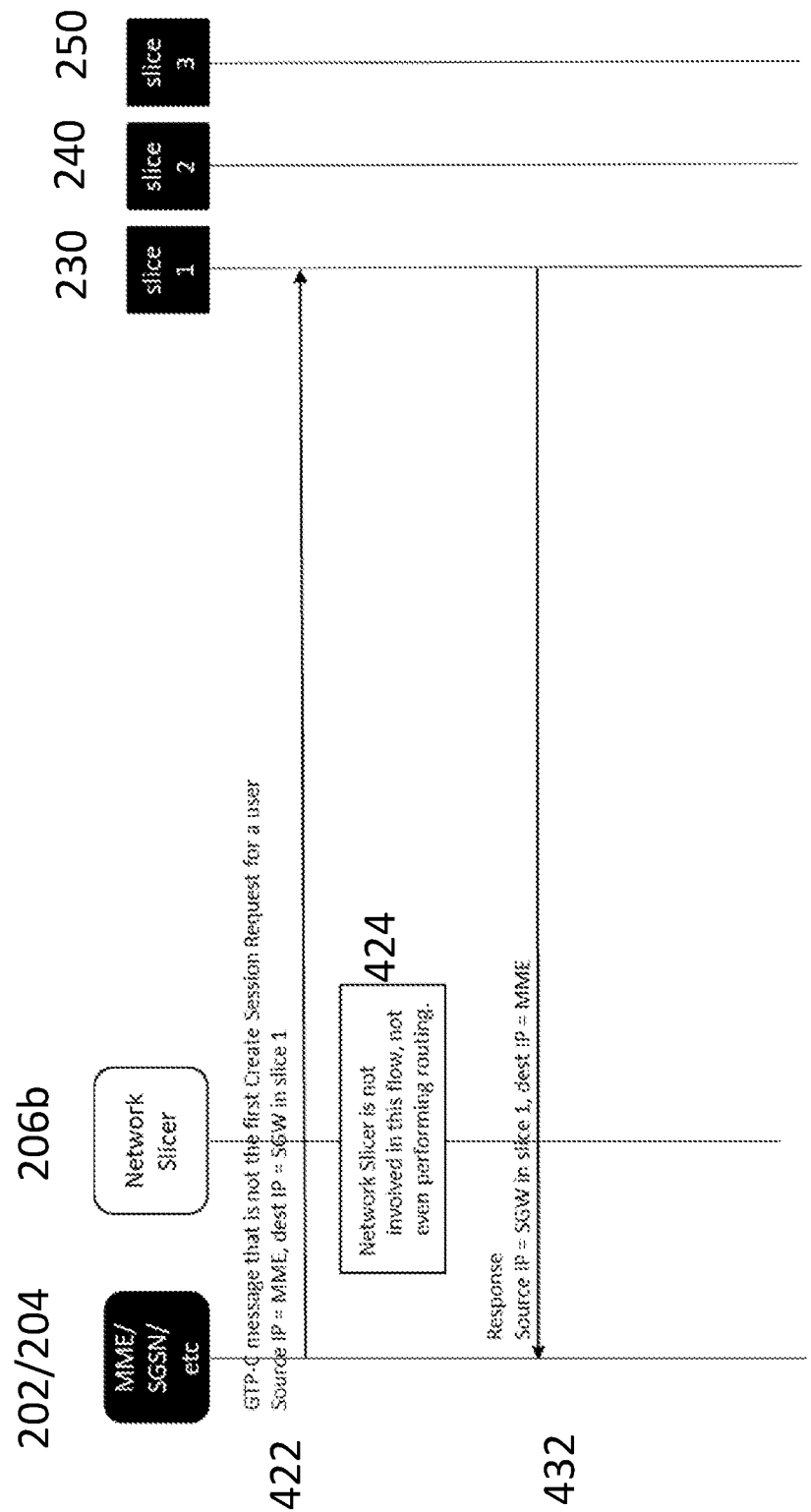

FIGS. 4A and 4B are flow charts showing message flows for GTP-C messages that are not Create Session Request or Create PDP Context Request, according to some embodiments of the present disclosure. The message flow in FIG. 4A can be associated with the non-intrusive network slicer 206a shown in FIG. 2A, according to some embodiments.

Referring to step 402, MME 202 routes a GTP-C that is not a Create Session Request to the network slicer 206a. The MME 202 may route the request to network slicer 206a because network slicer 206a informs the next hop router or MME, SGSN, SGW, TWAN, and ePDG directly that router 208 has the cheapest routing costs. Thus, all packets regardless of type may be sent to the network slicer 206a. The received request has a source IP address associated with the MME 202 and a destination IP address of an SGW 232 in slice 1 230.

Referring to step 404, network slicer 206a determines that the packet is not a create session request (also referred to herein "other control messages") and routes the packet to the destination IP associated with the request, which is SGW 232 in slice 1 230. In this way, the routers 208 and 210 act as normal routers.

Referring to step 406, network slicer 206a receives a response from SGW 232 in slice 1 230, which has a source IP address associated with from SGW 232 in slice 1 and a destination address associated with MME 202.

Referring to step 408, network slicer 206a determines that the packet is not a create session response and routes the packet to the destination IP associated with the response, which is the IP address associated with MME 202. In this way, the routers 208 and 210 act as normal routers.

The message flow in FIG. 4B can be associated with the minimally intrusive network slicer 206b shown in FIG. 2B, according to some embodiments. As shown in FIG. 4B, referring to step 422, MME 202 routes a GTP-C that is not a Create Session Request to directly to the SGW 232 in slice 1 230. This is because, as described in more detail below, the left side element, such as the MME 202, will have received an indication in a response message of a selected slice, and will route traffic directly to that selected slice. Referring to step 424, network slicer 206b is not involved in traffic between MME 202 and SGW 232 in slice 1 230. Similarly, in step 432, the network slicer 206b is bypassed in communications between MME 202 and SGW 232 in slice 1 230.

Figure 5A:
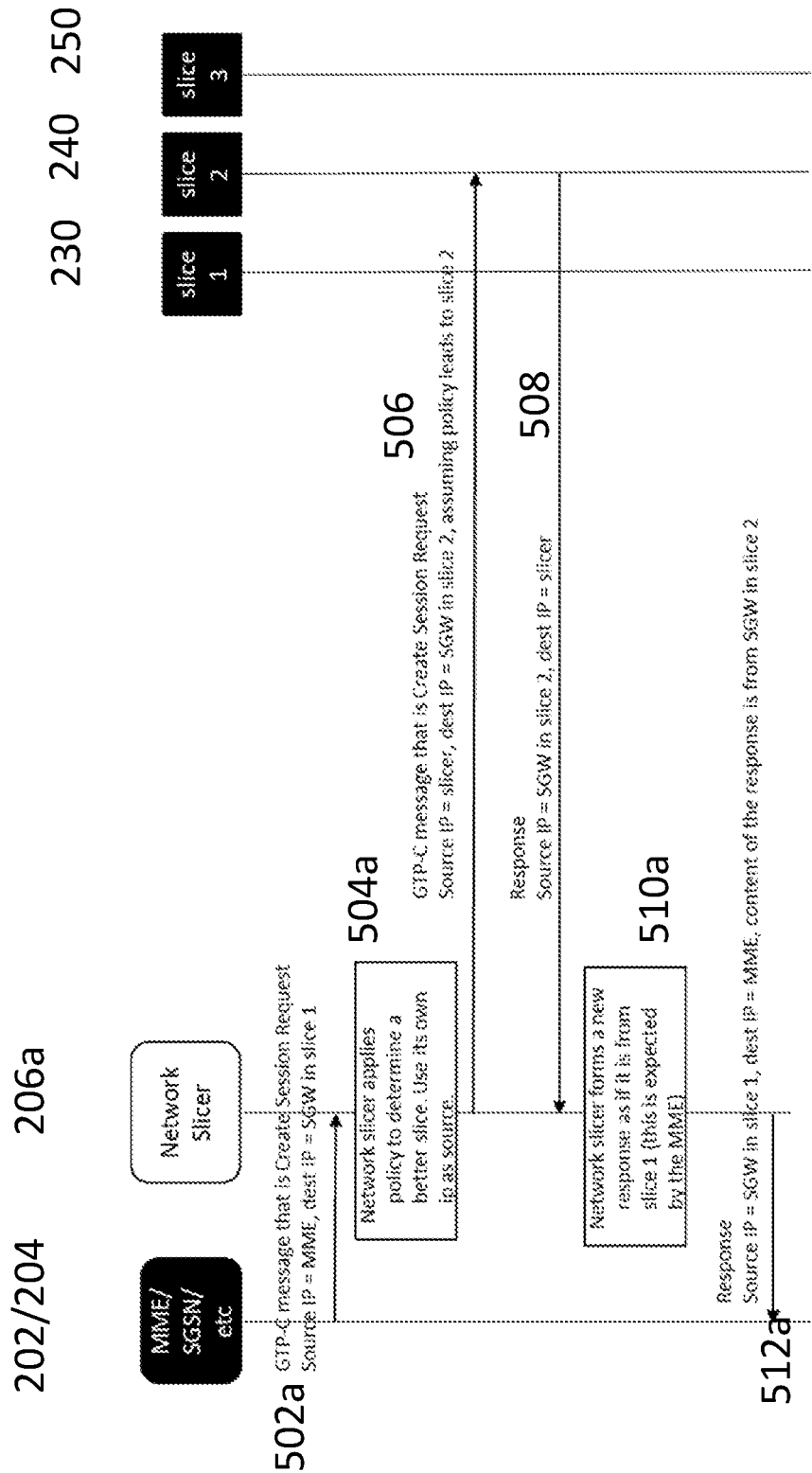
FIGS. 5A and 5B are flow charts showing message flows for GTP-C messages that are Create Session Requests or Create PDP Context Requests, according to some embodiments of the present disclosure.
Figure 5B:
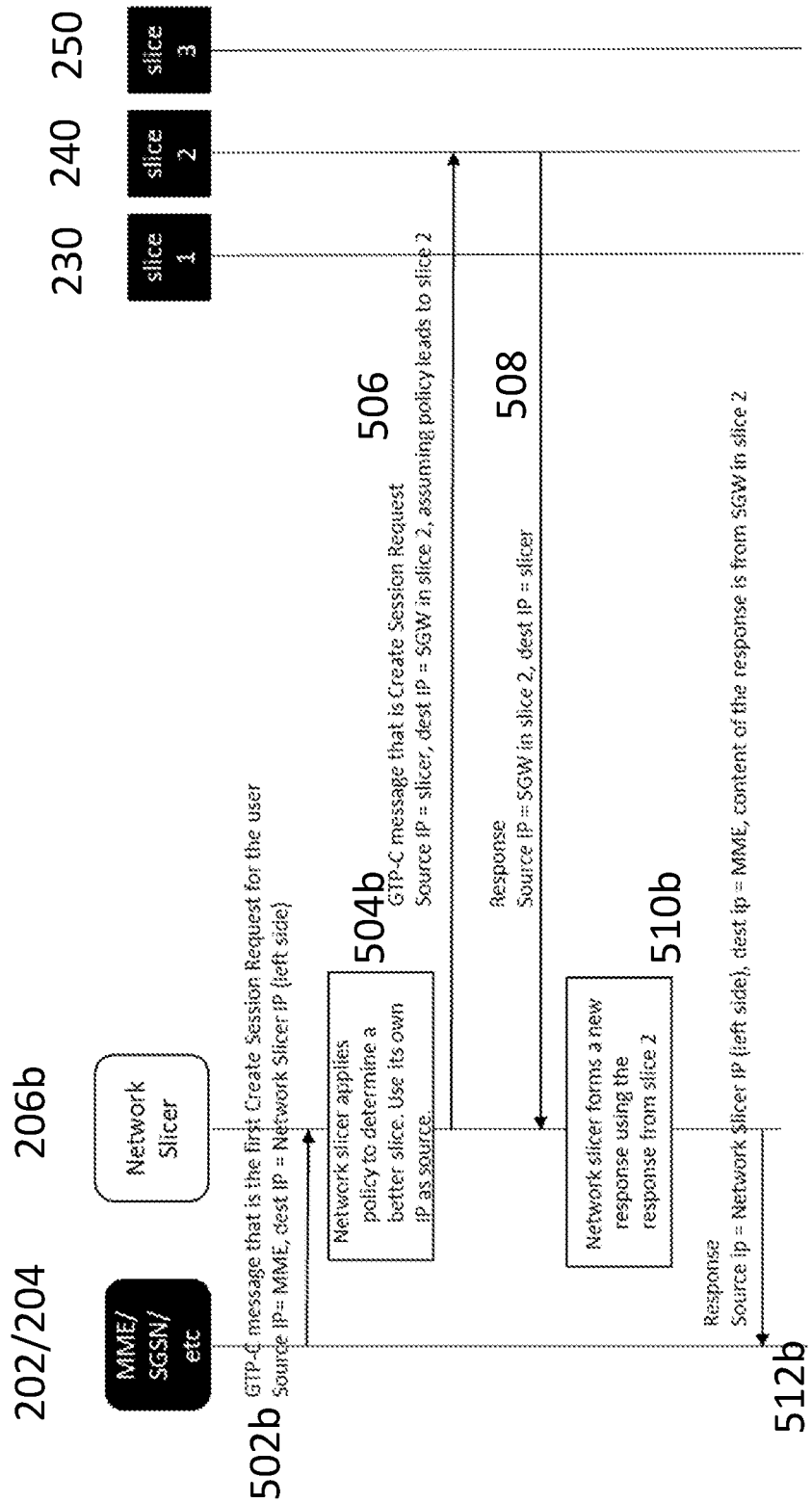

FIGS. 5A and 5B are flow charts showing message flow for GTP-C messages that are Create Session Requests or Create PDP Context Requests for the non-intrusive network slicer 206a (FIG. 5A) and the minimally intrusive network slicer (FIG. 5B), according to some embodiments of the present disclosure. Similarly labeled steps function similarly between FIGS. 5A and 5B unless otherwise noted below.

Referring to steps 502a and 205b, a network element, such as an MME 202 routes a GTP-C that is a create session request to the network slicer 206a/206b. The request has a source IP address associated with the MME 202 and a destination IP address of an SGW 232 in slice 1 230. In some embodiments, as shown in the non-intrusive embodiment of FIG. 5A, the MME 202 request was routed to the network slicer 206a because the network slicer 206a informed the next hop router (e.g., a router between the left side network element and the network slicer 206a) or MME, SGSN, SGW, TWAN, and ePDG directly that the network slicer 206a has a cheaper routing cost than other routers in the network. For example, the network slicer 206a may be configured to indicate a routing cost that is zero or below an expected threshold that other routers are expected to indicate. Accordingly, routers attempting to route from the left side elements to the right side elements in FIG. 2A will route messages, including creation messages and non-creation messages, through the network slicer 206a because the routers see the network slicer 206a as having lower routing costs to the network slices relative to other routers. As shown in FIG. 5B, during deployment of the network slicer 206b, the DNS 120 can be updated to include the network slicer 206b of FIG. 2B as the highest priority right side node. This can be accomplished by a manual reconfiguration during deployment, or can be performed automatically by the network slicer 206b. Thus, when a left side element queries the DNS for a right side element to send the creation request, the DNS 120 will return the IP address 214 as the highest priority element even though the network slicer is not a PGW, SGW, or GGSN. Accordingly, the network slicer 206b receives initial creation messages from the left side elements to the right side elements directly at the IP address 214.

Referring to step 504a, network slicer 206a determines that the packet is a create session request and applies a policy to determine a better slice than the one indicated in the create session request. In step 504b, the network slicer 206b may not need to determine that the packet is a create request because network elements such as MME 202 only route creation requests to the network slicer 206b explicitly using IP address 214 (this can be because future messages can be routed directly to the right side element selected by the network slicer 206b). In steps 504a and 504b, network slicers 206a/206b apply one or more policies to identify if a different network slice should be used. In some embodiments, the network slicers 206a/206b use the information elements from the Create Session Requests and/or the source IP of the MME/SGSN as the input. The information used includes (but is not limited to) any one or more of IMSI, Location, Access Point Name (APN), Device id IMEI, Radio Access Technology type and Time of Day. Network slicer 206a/206b then searches through the locally configured policies for the best match based on the above-identified information. For example, a best match can be specified by an operator that wants to use a dedicated SGW and a dedicated PGW for a particular group of users, such as those at a certain location, those with a certain IMSI, those with a certain APN type, etc. The locally configured policy can identify the IMSI of the users and link them to a specified SGW and PGW. The policy can also refer to a linkage to an external policy server. The network slicer 206a/206b then queries the external server to determine the best slice to use. External servers can contain similar policies that instruct the network slicer 206a/206b to make similar selections to the locally configured policies based on similar information. Network slicer 206a/206b can also assign its own IP address as the source IP address for the modified Create Session Request or Create PDP Context Request. A person of ordinary skill in the art would understand from the present disclosure that, rather than modifying the existing Create Session Request or Create PDP Context Request, a new Create Session Request or Create PDP Context Request could be created with the required information.

Referring to step 506, network slicer 206a/206b transmits a GTP-C create session request to the slice selected based on the policy (which is, for example, SGW 242 in slice 2 (240) in this figure) and sets the source address as the network slicer's own IP address.

Referring to step 508, network slicer 206a/206b receives a response from SGW 242 in slice 2 240, which has a source IP address associated with from SGW 242 in slice 2 and a destination address associated with the network slicer 206a/206b (e.g., IP address 212).

Referring to steps 510a and 510b, network slicer 206a/206b determines that the packet is a create session response and creates a new response (or modifies the existing response) with a source IP address associated with slice 1 230 (the source address expected by the MME in FIG. 5A) or network slicer 206b (the source address expected by the MME in FIG. 5B) and the destination IP address associated with MME 202. In some embodiments, the message content from the SGW in slice 2 can already contain the IP address that the MME 202 shall use for future communications with the SGW. Exemplary content and relevant handling by the MME 202 are defined, for example, by 3GPP (e.g., 29.274 and 29.060).

Referring to steps 512a and 512b, network slicer 206a transmits the response to MME 202 with an updated source IP (SGW 232 of slice 1 230 in FIG. 5A or network slicer 206b in FIG. 5B) and a destination address of the MME 202. Even though the source IP indicates that the response came from slice 1 230, the content of the response is from SGW 242 of slice 2 240. The content includes information informing the MME 202 of the identity of the selected slice and gateway by the network slicer 206a/206b such that MME 202 can communicate with the selected slice and gateway in future messaging related to the UE session. In some embodiments, the IP address of the selected slice can be included in the message content in compliance with, for example, 3GPP standards 29.274 for GTPv2 messages, or 29.060 for GTPv1 messages. In some embodiments, Slice 1 and Slice 2 are two different sets of SGW, PGW and GGSNs. The slices may offer different capabilities. For example, Slice 1 may only have an SGW, PGW and GGSN that can handle regular speed user traffic whereas Slice 2 may have an SGW, PGW and GGSN that can support higher speed user traffic. As another example, a network slicer 206a can be used to direct UEs that are capable of a 5G level of throughput to a high-speed slice such that the network can provide the best service to the UEs.

In some embodiments, multiple instances of network slicers can be used in a network to provide redundancy. In such a redundant embodiment, multiple slicers can be introduced into the network, and, for non-intrusive embodiments, subsets thereof or all of them can be treated as equal cost routes towards the SGW/PGW and GGSN. Removal or failure of one such slicer does not impact the operation of the network because the messages can be routed via other slicer instances. In some minimally intrusive embodiments, each network slicer can be given its own IP address 214. Accordingly, when one of the plural network slicers fails, the left side elements can detect the failure and use other network slicers instead.

Figure 6A:
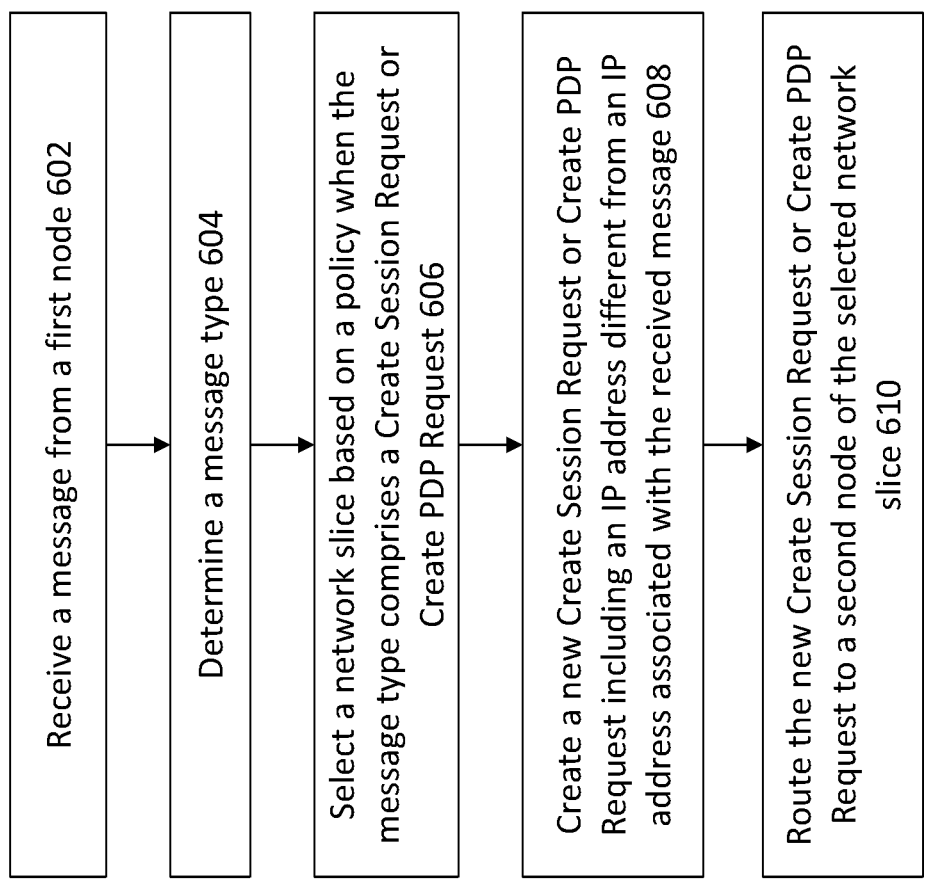
FIGS. 6A and 6B are flow charts showing processes of routing uplink packets in a network using a non-intrusive network slicer or minimally intrusive network slicer, according to some embodiments of the present disclosure.
Figure 6B:
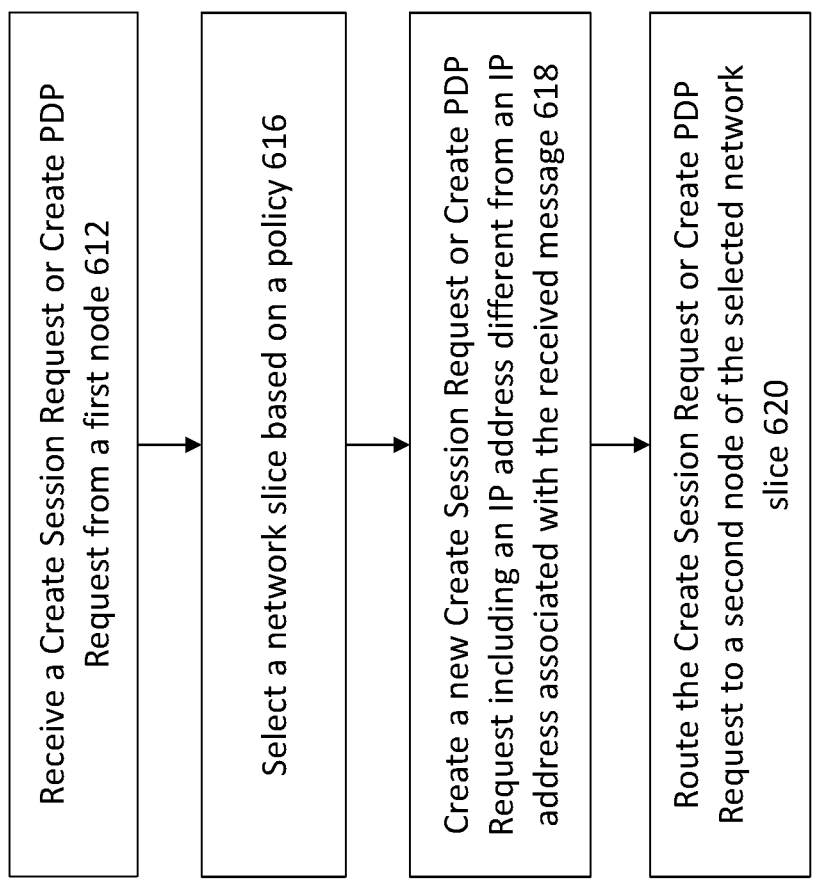

FIGS. 6A and 6B are flow charts showing processes of routing uplink packets in a network using non-intrusive and minimally intrusive network slicers, respectively, according to some embodiments of the present disclosure.

Referring to step 602, network slicer 206a receives a message from a first node. In some embodiments, the first node can comprise one of an MME, SGW, SGSN, TWAN, or ePDG.

Referring to step 604, network slicer 206a determines a message type associated with the first node. A message type can be one of a Create Session Request, Create PDP Request, or other control message (e.g., a non-Create Session request such as Modify Bearer Request, Delete Session Request etc.).

Referring to step 606, network slicer 206a selects a network slice based on a policy of the slicer when the message type comprises a Create Session Request or a Create PDP Request. As described above, when the message type comprises a Create Session Request or a Create PDP Request, network slicer 206a searches for a policy in either an internal or external policy database or server based on information associated with the first node, such as one or more of IMSI, Location, Access Point Name (APN), Device ID, IMEI, Radio Access Technology type, MS-ISDN, and Time of Day. In some embodiments, the network slicer may record the content of the incoming request, the target slice intended by the originating network node, the target slice selected, and/or other identifying information about the request, which can be used to populate and/or forward new response messages based on response messages received from right side elements. The use of such recorded information is described, for example, with reference to FIGS. 5A and 7. In some non-intrusive embodiments, the network slicer 206a may also receive non-creation request type messages. In such embodiments, non-creation request type messages are routed by the routers of the network slicer without selecting a new network slice as discussed, for example, with reference to FIG. 4A.

Referring to step 608, network slicer 206a creates a new Create Session Request or a Create PDP Request (or modifies the received request) with a different source and destination IP address different from the source and destination IP address associated with the received message. For example, the source IP address associated with the new message is an IP address associated with the network slicer 206a and the destination IP address is associated with the selected network slice.

Referring to step 610, network slicer 206a routes the new Create Session Request or a Create PDP Request to a second node of the selected network slice. As described above, in some embodiments, the first node can comprise one of an MME, SGW, SGSN, TWAN, or ePDG. In some embodiments, the second node can comprise one of SGW, PGW, and GGSN. The network slicer 206a can route traffic between at least MME and SGW, SGSN and SGW, SGSN and GGSN, SGW and PGW, TWAN and PGW, and ePDG and PGW.

FIG. 6B shows a process for network slicer 206b that is similar to the process shown in FIG. 6A for network slicer 206a.

Referring to step 612, network slicer 206b receives a message from a first left side node. In some embodiments, the first node can comprise one of an MME, SGW, SGSN, TWAN, or ePDG. Because the network slicer 206b expects to receive creation requests directly from such network elements at the network slicer 206b's host IP address 214 as the destination address, the network slicer 206b does not need to determine a message type associated with the message and further does not need to inform next hop routers that the network slicer 206b has lower routing costs relative to other routers.

Referring to step 616, network slicer 206b selects a network slice based on a policy of the slicer. As described above, network slicer 206b searches for a policy in either an internal or external policy database or server based on information associated with the first node, such as one or more of IMSI, Location, Access Point Name (APN), Device ID, IMEI, Radio Access Technology type, MS-ISDN, and Time of Day. In some embodiments, the network slicer 206b may record the content of the incoming request, the target slice intended by the originating network node, the target slice selected, and/or other identifying information about the request, which can be used to populate and/or forward new response messages based on response messages received from right side elements. The use of such recorded information is described, for example, with reference to FIGS. 5B and 7.

Referring to step 618, network slicer 206b creates a new Create Session Request or a Create PDP Request (or modifies the received request) with a different source and destination IP address different from the source and destination IP address associated with the received message. For example, the source IP address associated with the new message is an IP address associated with the network slicer 206b and the destination IP address is associated with the selected network slice.

Referring to step 620, network slicer 206b routes the new Create Session Request or a Create PDP Request to a second node of the selected network slice. As described above, in some embodiments, the first node can comprise one of an MME, SGW, SGSN, TWAN, or ePDG. In some embodiments, the second node can comprise one of SGW, PGW, and GGSN. The network slicer 206a can route traffic between at least MME and SGW, SGSN and SGW, SGSN and GGSN, SGW and PGW, TWAN and PGW, and ePDG and PGW.

Figure 7:
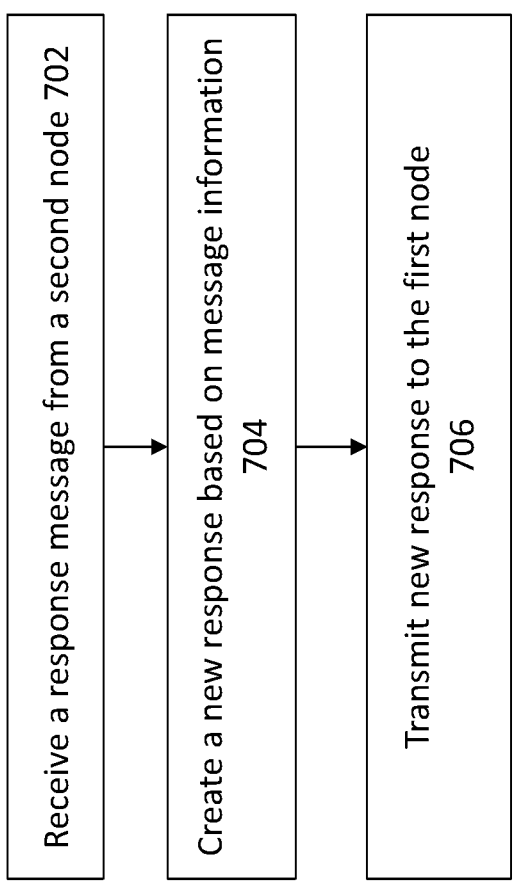
FIG. 7 is a flow chart showing a process of routing downlink packets in a network using a non-intrusive network slicer or minimally intrusive network slicer, according to some embodiments of the present disclosure.

FIG. 7 is a flow chart showing a process of routing downlink packets in a network using a non-intrusive or minimally intrusive network slicer, according to some embodiments of the present disclosure.

Referring to step 702, network slicer 206a/206b receives a Create Session Response or a Create PDP Response. The network slicer 206a/206b receives a Create Session Response or a Create PDP Response only for responses to requests that were routed through the network slicer 206a/206b.

Referring to step 704, network slicer 206a/206b creates a new response (or modifies the received response) based on information recorded when the original request was processed as well as the content of the incoming response. The information recorded includes the IP address of the MME, SGSN, TWAN, and/or ePDG, which sent the original Create Session Request or Create PDP Context Request. The information also includes the destination IP address of the original Create Session Request or Create PDP Context Request. In some embodiments, the recorded MME, SGSN, TWAN, and/or ePDG address becomes the destination IP address of the new response message. For network slicer 206a, the recorded destination IP address from the original creation message can become the source IP of the new message. For the network slicer 206b, the host IP address 214 of the network slicer 206b can become the source IP address for the new message. The content of the incoming response message can be copied over to the new response message, but with a modification indicating that the selected slice (e.g., slice 2 in the example above) is to be used for future communications as discussed above. The IP address of the selected slice can be included in the message content in compliance with, for example, 3GPP standards 29.274 for GTPv2 messages, or 29.060 for GTPv1 messages.

Referring to step 706, network slicer 206a/206b transmits the new response to the first node. In some embodiments, the response includes content indicating an IP address of the selected slice and node as described above with reference to step 706. By providing this information, further messages sent by the first node to the network can be directed to the selected second node. In some embodiments, at step 706, the network slicer 206a/206b deletes any information recorded related to the creation messages discussed with reference to FIGS. 6A/6B and the response messages discussed with reference to FIG. 7. Thus the network no longer maintains any information related to the established session after forwarding a response message to the left side element, making the network slicer a "stateless" solution.

In addition to the network slicing capabilities described above, the network slicer 206a/206b can also be used for the following purposes discussed below.

According to some embodiments, the network slicers 206a and/or 206b can be used for gateway maintenance. The network slicer can be introduced to a running network to help migrate users from one gateway to others without impacting the service. This allows a network operator to perform upgrades, load balancing of a running network, or other tasks that can be facilitated by adaptive of controlled network slicing. Once the procedure is complete, the Network Slicer can be removed seamlessly.

According to some embodiments, the network slicers 206a and/or 206b can be used for trouble shooting. The network slicer can be used to force a PDN or PDP Context to a particular set of gateways, for example, for debugging purposes. The same function can also be used to test new capability of a gateway or users of a gateway. For example, particular users can be onloaded or offloaded from a new or updated gateway in a controlled manner in order to test the new capabilities in a controlled manner. Because the network slicer has access to many different types of information, including, for example, IMSI, Location, Access Point Name (APN), Device id IMEI, Radio Access Technology type and Time of Day, a network operator can control the conditions of the test scenario for particular characteristics of users or other network elements.

In some embodiments, advantages of using network slicer 206a and/or 206b can include those described below.

In some embodiments, the network slicer can be transparent from the MME or SGSN's perspective. No changes to existing network function such as MME, SGSN, TWAN, ePDG, DNS server, SGW, PGW and GGSN are required. It is much easier to introduce the network slicer function as compared to traditional proxy approach. Furthermore, even for a minimally intrusive slicer, modification only needs to occur to the DNS server.

In some embodiments, the network slicers 206a, 206b can be stateless. The network slicer 206a/206b does not need to maintain the session state, rather the session state is still maintained by the MME/SGSN/TWAN/ePDG and the SGW/PGW/GGSN. Thus, the network slicer 206a/206b may not add another failure domain to the network. Failure of a network slicer may not impact established sessions.

In some embodiments, the network slicers disclosed herein can provide more comprehensive slice selection functions as compared to what can be achieved using DNS based solution on the existing MME/SGSN/TWAN/ePDG. The network slicer allows the operator to use any UE related information to determine the right slice to use.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices, (e.g., EPROM, EEPROM, and flash memory devices); magnetic disks, (e.g., internal hard disks or removable disks); magneto optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The subject matter described herein can be implemented in a computing system that includes a back end component (e.g., a data server), a middleware component (e.g., an application server), or a front end component (e.g., a client computer having a graphical user interface or a web browser through which a user can interact with an implementation of the subject matter described herein), or any combination of such back end, middleware, and front end components. The components of the system can be interconnected by any form or medium of digital data communication, e.g., a communication network. Examples of communication networks include a local area network ("LAN") and a wide area network ("WAN"), e.g., the Internet.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter, which is limited only by the claims which follow.

What is claimed is:

1. A method comprising:
   receiving, at a network slicer in a networked system, a first message from a first network node of the networked system;
   determining, by the network slicer, a first destination address from the first message, the first destination address corresponding to a first network slice node that is part of a first network slice comprising a first plurality of network elements;
   determining, by the network slicer, that the first message is a creation request message;
   determining a destination type from the first message;
   identifying, by the network slicer, based on one or more of a policy of the network slicer or an external policy, a second network slice node of the networked system having the destination type, wherein the second network slice node is part of a second network slice that is different from the first network slice, the second network slice comprising a second plurality of network elements;
   creating, by the network slicer, a new creation request message, wherein a source address of the new creation request message is a network slicer address, and wherein a destination address of the new creation request message is an address of the second network slice node that is part of the second network slice; and
   transmitting the new creation request message from the network slicer to the second network slice node.

2. The method of claim 1, wherein the first network node is one or more of a mobility management entity (MME), a serving general packet radio services (GPRS) support node (SGSN), serving gateway (SGW), enhanced packet data gateway (ePDG), or a trusted WLAN.

3. The method of claim 1, wherein the determined destination type comprises a gateway general packet radio services (GPRS) support node (GGSN), a serving gateway (SGW), or a packet data network gateway (PGW).

4. The method of claim 1, wherein identifying the second network slice node comprises:
    determining, by the network slicer, one or more of a throughput capability level of a user equipment (UE) associated with the first message, an enterprise associated with the UE associated with the first message, a traffic speed of the UE associated with the first message, a security level or requirement of the UE associated with the first message, or an employee status of an owner of the UE associated with the first message, and
    selecting, by the network slicer, the destination address associated with one or more of a capability level of the UE, an enterprise of the UE, the traffic speed of the UE, the security level or requirement of the UE, or the employee status of the owner of the UE from a plurality of destination addresses.

5. The method of claim 1, wherein identifying the second network slice node comprises determining one or more of an International Mobile Subscriber Identity (IMSI) of a user equipment associated with the first message, location of the user equipment associated with the first message, access point name (APN) associated with the first message, an International Mobile Equipment Identity (IMEI) identification number of the user equipment associated with the first message, a Radio Access Technology type associated with the first message, or a timestamp of the first message.

6. The method of claim 1, further comprising:
    receiving, by the network slicer, a response message from the second network slice node; and
    creating, by the network slicer, a new response message including:
        the first destination address corresponding to the first network slice node as the source address of the new response message, and
        message content from the response message sent by the second network slice node.

7. The method of claim 6, further comprising:
    storing, at the network slicer, one or more of an address associated with the first network node or the destination address prior to the receiving the response message from the second network slice node; and
    deleting, by the network slicer, at least one address associated with the first network node or the destination address after the new response message is created.

8. The method of claim 1, further comprising indicating to a next hop router by the network slicer that a router associated with the network slicer has a lower routing cost to a third network node than an expected routing cost from other routers in the networked system to the third network node prior to the receiving the first message, wherein the lower routing cost to the third network node is lower than an actual routing cost to the third network node.

9. A method comprising:
    receiving, at a network slicer in a networked system, a creation request message from a first network node, the creation request message having as a first destination address an address associated with the network slicer;
    determining a destination type from the creation request message;
    selecting, by the network slicer, a second destination address for the creation request message based on one or more of a policy of the network slicer or an external policy, the second destination address being associated with a second network slice node of the networked system having the destination type, wherein the second network slice node is part of a network slice comprising a plurality of network elements;
    creating, by the network slicer, a new creation request message including message content from the creation request message, wherein a source address of the new creation request message is a network slicer address, and wherein a destination address of the new creation request message is the second destination address associated with the second network slice node that is part of the network slice; and
    transmitting the new creation request message from the network slicer to the second network slice node of the networked system associated with the second destination address.

10. The method of claim 9, further comprising:
    receiving, by the network slicer, a response message from the second network slice node; and
    creating, by the network slicer, a new response message, wherein a source address of the new response message is the network slicer address, wherein a destination address of the new response message is an address of the first network node, and wherein the new response message comprises message content from the response message sent by the second network slice node.

11. The method of claim 10, further comprising:
    storing, at the network slicer, one or more of the address associated with the first network node or the second destination address prior to the receiving the response message from the second network slice node; and
    deleting, by the network slicer, the stored one or more of the address associated with the first network node or the second destination address after the creating the new response message.

12. The method of claim 9, wherein the first network node is one or more of a mobility management entity (MME), a serving general packet radio services (GPRS) support node (SGSN), serving gateway (SGW), enhanced packet data gateway (ePDG), or a trusted WLAN.

13. The method of claim 9, wherein the determined destination type comprises a gateway general packet radio services (GPRS) support node (GGSN), a serving gateway (SGW), or a packet data network gateway (PGW).

14. The method of claim 9, wherein the selecting the second destination address for the creation request message based on the one or more of the policy of the network slicer or the external policy comprises:
    determining, by the network slicer, one or more of a throughput capability level of a user equipment (UE) associated with the creation request message, an enterprise associated with the UE associated with the creation request message, a traffic speed of the UE associated with the creation request message, a security level or requirement of the UE associated with the creation request message, or an employee status of an owner of the UE associated with the creation request message, and
    selecting, by the network slicer, the second destination address associated with one or more of a capability level of the UE, an enterprise of the UE, a traffic speed of the UE, a security level or requirement of the UE, or an employee status of an owner of the UE from a plurality of second destination addresses.

15. The method of claim 9, further comprising indicating to a domain name system of the networked system that the address associated with the network slicer has a higher priority than at least the second network slice node prior to the receiving the creation request message.

16. A network slicer in a networked system, the network slicer comprising:
a processor; and
a storage medium having instructions contained thereon that cause the processor to:
receive, at the network slicer in the networked system, a first message from a first network node of the networked system;
determine, by the network slicer, a first destination address from the first message, the first destination address corresponding to a first network slice node that is part of a first network slice comprising a first plurality of network elements;
determine, by the network slicer, that the first message is a creation request message;
determine a destination type from the first message;
identify, based on one or more of a policy of the network slicer or an external policy, a second network slice node of the networked system having the destination type, wherein the second network slice node is part of a second network slice that is different from the first network slice, the second network slice comprising a second plurality of network elements;
create, by the network slicer, a new creation request message, wherein a source address of the new creation request message is a network slicer address, and wherein a destination address of the new creation request message is an address of the second network slice node that is part of the second network slice; and
transmit the new creation request message from the network slicer to the second network slice node.

17. The network slicer of claim 16, wherein the first network node is one or more of a mobility management entity (MME), a serving general packet radio services (GPRS) support node (SGSN), serving gateway (SGW), enhanced packet data gateway (ePDG), or a trusted WLAN.

18. The network slicer of claim 16, wherein the determined destination type comprises a gateway general packet radio services (GPRS) support node (GGSN), a serving gateway (SGW), or a packet data network gateway (PGW).

19. The network slicer of claim 16, wherein identifying the second network slice node comprises causing the processor to:
determine, by the network slicer, one or more of a throughput capability level of a user equipment (UE) associated with the first message, an enterprise associated with the UE associated with the first message, a traffic speed of the UE associated with the first message, a security level or requirement of the UE associated with the first message, or an employee status of an owner of the UE associated with the first message, and
select, by the network slicer, the destination address associated with one or more of a capability level of the UE, the enterprise of the UE, the traffic speed of the UE, the security level or requirement of the UE, or the employee status of the owner of the UE from a plurality of destination addresses.

20. The network slicer of claim 16, wherein identifying the second network slice node comprises determining one or more of an International Mobile Subscriber Identity (IMSI) of a user equipment associated with the first message, location of the user equipment associated with the first message, access point name (APN) associated with the first message, an International Mobile Equipment Identity (IMEI) identification number of the user equipment associated with the first message, a Radio Access Technology type associated with the first message, or a timestamp of the first message.

21. The network slicer of claim 16, wherein the processor is further caused to:
receive, by the network slicer, a response message from the second network slice node; and
create, by the network slicer, a new response message including:
the first destination address corresponding to the first network slice node as a source address of the new response message, and
message content from the response message sent by the second network slice node.

22. The network slicer of claim 21, further comprising additional instructions that cause the processor to:
store, at the network slicer, one or more of an address associated with the first network node or the destination address prior to the receiving the response message from the second network slice node; and
delete, by the network slicer, the stored one or more of the address associated with the first network node or the destination address after the new response message is created.

23. The network slicer of claim 16, wherein the processor is further caused to indicate to a next hop router by the network slicer that a router associated with the network slicer has a lower routing cost to a third network node than an expected routing cost from other routers in the networked system to the third network node prior to the receiving the first message, wherein the lower routing cost to the third network node is lower than an actual routing cost to the third network node.

24. A network slicer in a networked system, the network slicer comprising:
a processor; and
a storage medium having instructions contained thereon that cause the processor to:
receive, at the network slicer in the networked system, a creation request message from a first network node, the creation request message having as a first destination address an address associated with the network slicer;
determine a destination type from the creation request message;
select, by the network slicer, a second destination address for the creation request message based on one or more of a policy of the network slicer or an external policy, the second destination address being associated with a second network slice node of the networked system having a destination type that is the same as the determined destination type, wherein the second network slice node is part of a network slice comprising a plurality of network elements;
create, by the network slicer, a new creation request message including message content from the creation request message, wherein a source address of the new creation request message is a network slicer address, and wherein a destination address of the new creation request message is the second destination address associated with the second network slice node that is part of the network slice; and
transmit the new creation request message from the network slicer to the second network slice node of the networked system associated with the second destination address.

25. The network slicer of claim 24, wherein the processor is further caused to:
receive, by the network slicer, a response message from the second network slice node; and
create, by the network slicer, a new response message, wherein a source address of the new response message is the network slicer address, wherein a destination address of the new response message is an address of the first network node, and wherein the new response message comprises message content from the response message sent by the second network slice node.

26. The network slicer of claim 25, wherein the processor is further caused to:
store, at the network slicer, one or more of the address associated with the first network node or the second destination address prior to the receiving the response message from the second network slice node; and
delete, by the network slicer, the stored one or more of the address associated with the first network node or the second destination address after the creating the new response message.

27. The network slicer of claim 24, wherein the first network node is one or more of a mobility management entity (MME), a serving general packet radio services (GPRS) support node (SGSN), serving gateway (SGW), enhanced packet data gateway (ePDG), or a trusted WLAN.

28. The network slicer of claim 24, wherein the determined destination type comprises a gateway general packet radio services (GPRS) support node (GGSN), a serving gateway (SGW), or a packet data network gateway (PGW).

29. The network slicer of claim 24, wherein the selecting the second destination address for the creation request message based on the one or more of the policy of the network slicer or the external policy comprises causing the processor to:
determine, by the network slicer, one or more of a throughput capability level of a user equipment (UE) associated with the creation request message, an enterprise associated with the UE associated with the creation request message, a traffic speed of the UE associated with the creation request message, a security level or requirement of the UE associated with the creation request message, or an employee status of an owner of the UE associated with the creation request message, and
select, by the network slicer, the second destination address associated with one or more of a capability level of the UE, the enterprise of the UE, the traffic speed of the UE, the security level or requirement of the UE, or the employee status of the owner of the UE from a plurality of second destination addresses.

30. The network slicer of claim 24, wherein the processor is further caused to indicate to a domain name system of the networked system that the address associated with the network slicer has a higher priority than at least the second network slice node prior to the receiving the creation request message.

* * * * *